US012539713B2

(12) United States Patent
Holmes

(10) Patent No.: US 12,539,713 B2
(45) Date of Patent: Feb. 3, 2026

(54) SECURITY ELEMENTS AND METHOD OF MANUFACTURE THEREOF

(71) Applicant: DE LA RUE INTERNATIONAL LIMITED, Basingstoke (GB)

(72) Inventor: Brian Holmes, Basingstoke (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 0 days.

(21) Appl. No.: 18/117,624

(22) Filed: Mar. 6, 2023

(65) Prior Publication Data

US 2023/0202223 A1 Jun. 29, 2023

Related U.S. Application Data

(63) Continuation of application No. 17/040,413, filed as application No. PCT/GB2019/050829 on Mar. 22, 2019, now abandoned.

(30) Foreign Application Priority Data

Mar. 22, 2018 (GB) ...................... 1804630

(51) Int. Cl.
B42D 25/324 (2014.01)
B42D 25/29 (2014.01)
(Continued)

(52) U.S. Cl.
CPC ........... *B42D 25/29* (2014.10); *B42D 25/324* (2014.10); *B42D 25/328* (2014.10); *G02B 5/008* (2013.01); *G02B 5/0231* (2013.01); *B82Y 20/00* (2013.01)

(58) Field of Classification Search
CPC .... B42D 25/324; B42D 25/328; G02B 5/008; G02B 5/0231
See application file for complete search history.

(56) References Cited

U.S. PATENT DOCUMENTS

2013/0093172 A1* 4/2013 Fuhse .................... B42D 25/24
283/67
2014/0092718 A1 4/2014 Kumar et al.
(Continued)

FOREIGN PATENT DOCUMENTS

CN 108422764 A 8/2018
DE 10 2012 110 630 A1 5/2014
(Continued)

OTHER PUBLICATIONS

U.S. Appl. No. 62/618,462 of Akhlaghi et al. (Year: 2018).*
(Continued)

Primary Examiner — Kyle R Grabowski
(74) Attorney, Agent, or Firm — Oliff PLC

(57) ABSTRACT

A security element including a first layer having a first surface, an array of image regions across the surface, each including at least first and second sub-regions, a first array of plasmonic nanostructures in or on the surface across the first sub-regions, defining in each a corresponding portion of a first image, a second array across the second sub-regions, defining in each a corresponding portion of a second image; wherein each sub-region has a respective average inclination and the average inclinations of the first sub-regions are such that the first image is displayed at least at a first viewing angle and those of the second sub-regions are such that the second image is displayed at least at a second viewing angle different from the first and the second image is substantially not or only partially displayed at least at the first angle. Also, a method of manufacturing the security element.

8 Claims, 23 Drawing Sheets

(51) Int. Cl.
  *B42D 25/328* (2014.01)
  *G02B 5/00* (2006.01)
  *G02B 5/02* (2006.01)
  *B82Y 20/00* (2011.01)

(56) References Cited

U.S. PATENT DOCUMENTS

| | | | |
|---|---|---|---|
| 2015/0298482 A1 | 10/2015 | Walter et al. | |
| 2016/0176221 A1* | 6/2016 | Holmes ................ | B42D 25/328 |
| | | | 283/77 |
| 2018/0022143 A1 | 1/2018 | Borgsmüller et al. | |
| 2020/0223243 A1* | 7/2020 | Petiton ................ | G02B 5/1861 |
| 2020/0341174 A1* | 10/2020 | Keshavarz Akhlaghi .................. | |
| | | | G02B 5/008 |

FOREIGN PATENT DOCUMENTS

| | | | | |
|---|---|---|---|---|
| EP | 0 059 056 A1 | 9/1982 | | |
| EP | 0 860 298 A2 | 8/1998 | | |
| EP | 2228672 A1 | 9/2010 | | |
| EP | 2 507 068 A1 | 10/2012 | | |
| EP | 2955564 A1 | 12/2015 | | |
| EP | 2385903 B1 | 7/2017 | | |
| EP | 3339048 A1 * | 6/2018 | ............. | B42D 25/23 |
| EP | 3470235 A1 | 4/2019 | | |
| WO | 33/00659 A1 | 3/1983 | | |
| WO | 00/39391 A1 | 7/2000 | | |
| WO | 03/054297 A2 | 7/2003 | | |
| WO | 03/095188 A2 | 11/2003 | | |
| WO | WO-2013039454 A1 * | 3/2013 | ........... | B42D 25/305 |
| WO | 2014/072358 A1 | 5/2014 | | |
| WO | 2015/113718 A1 | 8/2015 | | |
| WO | 2016/191817 A1 | 12/2016 | | |
| WO | 2017/015748 A1 | 2/2017 | | |
| WO | 2017/025277 A1 | 2/2017 | | |
| WO | 2017/184581 A1 | 10/2017 | | |
| WO | WO-2018224512 A1 * | 12/2018 | ............. | B42D 25/29 |
| WO | 2019/140527 A1 | 7/2019 | | |
| WO | 2021063126 A1 | 4/2021 | | |

OTHER PUBLICATIONS

Plasmonic Color Palettes for Photorealistic Printing with Aluminum Nanostructures https://pubs.acs.org/doi/epdf/10.1021/nl501460x (Year: 2014).*
EP-3339048-A1 English Translation (Year: 2018).*
Tan et al., "Plasmonic Color Palettes for Photorealistic Printing with Aluminum Nanostructures," Nano Letters, 2014, vol. 14, pp. 4023-4029.
Gu et al., "Color generation via subwavelength plasmonic nanostructures," Nanoscale, 2015, vol. 7, pp. 6409-6419.
Kristensen et al., "Plasmonic colour generation," Nature Reviews, Materials, 2017, vol. 2, Article No. 16088, pp. 1-14.
Cheng et al., "Structural color printing based on plasmonic metasurfaces of perfect light absorption," Scientific Reports, 2015, vol. 5, 11045, pp. 1-10.
Clausen et al., "Plasmonic Metasurfaces for Coloration of Plastic Consumer Products," Nano Letters, 2014, vol. 14, pp. 4499-4504.
Roberts et al., "Subwavelength Plasmonic Color Printing Protected for Ambient Use," Nano Letters, 2014, vol. 14, pp. 783-787.
Jun. 25, 2019 International Search Report issued in International Patent Application No. PCT/GB2019/050829.
Jun. 25, 2019 Written Opinion of the International Searching Authority issued in International Patent Application No. PCT/GB2019/050829.
Dec. 24, 2020 Office Action issued in British Patent Application No. 1804630.0.
Apr. 18, 2023 Third Party Observations issued in European Patent Application No. 19714763.0.
Aug. 15, 2025 Final Rejection received in U.S. Appl. No. 18/667,428.
May 8, 2025 Office Action issued in U.S. Appl. No. 18/667,428.

* cited by examiner

SECURITY ELEMENTS AND METHOD OF MANUFACTURE THEREOF

This application is a Continuation of application Ser. No. 17/040,413, filed Sep. 22, 2020, which is a national stage of PCT/GB2019/050829, filed Mar. 22, 2019, which claims priority to GB 1804630.0, filed Mar. 22, 2018. The entire contents of the prior applications are hereby incorporated by reference herein in their entirety.

FIELD OF THE INVENTION

The present invention relates to security elements such as those suitable for use in or on security documents such as banknotes, identity documents, passports, certificates and the like, as well as methods for manufacturing such security elements.

DESCRIPTION OF THE RELATED ART

To prevent counterfeiting and enable authenticity to be checked, security documents are typically provided with one or more security elements which are difficult or impossible to replicate accurately with commonly available means, particularly photocopiers, scanners or commercial printers. Many conventional security elements utilise optically variable effects, i.e. an appearance that changes upon rotation of the device, which cannot be replicated by copying, as with a photocopier or scanner. One class of optically variable security elements includes those that utilise diffractive optically variable effect generating relief structures, such as diffraction gratings, to generate optically variable effects by their surface structure. These elements are advantageous in that they can be formed with integral register between different structures and hence different colours as all structures can be formed in a single process. In contrast, processes that use printed inks in generating an optically variable effect, e.g. security elements that use printed image elements in combination with focusing elements, often suffer from misregistration between different colours since they are typically printed in separate print processes. Security elements that utilise diffractive optically variable effect generating relief structures suffer from the problem that, when viewed under diffuse lighting conditions, as is typical, the security element can appear noisy as diffraction conditions for multiple structures are satisfied simultaneously. It is desirable to produce a security element that exhibits optical variability including multiple colours in precise register, without the drawback associated with viewing under diffuse lighting conditions.

SUMMARY OF THE INVENTION

According to a first aspect of the present invention, there is provided a security element comprising: a first layer having a first surface; an array of image regions across the first surface, each image region comprising at least a first sub-region and a second sub-region; a first array of plasmonic nanostructures provided in or on the first surface across the first sub-regions, the first array of plasmonic nanostructures defining in each first sub-region a corresponding portion of a first image; and a second array of plasmonic nanostructures provided in or on the first surface across the second sub-regions, the second array of plasmonic nanostructures defining in each second sub-region a corresponding portion of a second image; wherein the first surface is arranged such that each sub-region has a respective average inclination and wherein the average inclinations of the first sub-regions are such that the first image is displayed at least at a first viewing angle and wherein the average inclinations of the second sub-regions are such that the second image is displayed at least at a second viewing angle different from the first viewing angle and such that the second image is substantially not displayed or only partially displayed at least at the first viewing angle.

The present inventor has identified that the object of the invention can be achieved using the relatively recently developed plasmonic nanostructures. Plasmonic nanostructures are structures that generate colour from the resonant interactions between light and metallic nanostructures where collective free-electron oscillations within the metallic nanostructure couple to electromagnetic fields in a neighbouring dielectric material. These structures are described in detail in: "Plasmonic Color Palettes for Photorealistic Printing with Aluminum Nanostructures", Shawn J. Tan et al., Nano Letters, 2014, 14 (7), pp 4023-4029, DOI: 10.1021/n1501460x; "Color generation via subwavelength plasmonic nanostructures", Yinghong Gu et al., Nanoscale, 2015, 7, pp 6409-6419, DOI: 10.1039/C5NR00578G; and "Plasmonic colour generation", Anders Kristensen et al., Nat. Rev. Mater. 2, 16088, (2016), pp 1-14, DOI: 10.1038/natrevmats.2016.88.

Plasmonic nanostructures are capable of generating colour that does not exhibit angular dispersion, as is the case with conventional diffraction gratings, where light rays corresponding to the first order diffractive orders redirected or diffracted by angles (beta) relative to the substrate normal according to the diffraction equation:

$$\frac{\lambda}{d} = \sin\alpha \pm \sin\beta$$

where $\lambda$ is wavelength of incident light, d is the width of a slit, $\alpha$ is the angle of incidence and $\beta$ is the angle of first order diffraction. Rather, the surface plasmon polariton resonance effects act to subtract certain parts of the incident light spectrum from the specular reflected light such that a net colour is imparted.

For example if the plasmonic resonances act to suppress the reflection of light in the green part of the spectrum (circa 520-550 nm) then the net reflected light will have a magenta hue or colour. Whereas if the blue part of the incident spectrum is suppressed by plasmon coupling in reflection then the net reflected light will have a yellow hue. Note this subtractive colour effect will not be substantially modified by the angle of incidence and reflection and therefore plasmonic nanostructures can be substantially optically invariable, meaning that white light at substantially any angle of incidence will generate substantially the same colour for a particular viewing angle. This intrinsic optical invariability means, however, that these structures do not immediately lend themselves to the production of optically variable security elements. The present inventor has, however, identified that optical variability can be introduced to a security element comprising plasmonic nanostructures by other means in order to meet the object of the present invention.

Specifically, it has been found that these plasmonic nanostructures can be provided in or on the surface of a security element across differently inclined sub-regions, and the inclination of those sub-regions used to provide that different sets of plasmonic nanostructures are visible at different viewing angles. For example, the surface of the security element may be arranged such that at the first viewing angle, the first sub-regions are visible to the viewer and simultaneously obscure from view the second sub-regions. Hence, only the colours generated by the plasmonic nanostructures in the first sub-regions will be visible. Upon tilting of the device to the second viewing angle, however, the second sub-region becomes visible and the colours generated by the plasmonic nanostructures in the second sub-regions will be visible.

The surface is divided into a plurality of image regions, each comprising a first and second sub-region. A first array of plasmonic nanostructures is provided in the first sub-regions in accordance with a first image. That is, each first sub-region may be considered to represent a portion of a first image and the plasmonic nanostructures provided in each first sub-region so as to define that portion of the first image. Thus, when the security element is viewed so that the first sub-regions are visible, the combined appearance of the first sub-regions presents to the viewer the first image. Similarly, each second sub-region represents a portion of a second image and the plasmonic nanostructures provided in each second sub-region define the portion of that second image.

Various effects may be achieved using the present structure for displaying different images at different viewing angles. For example, the sub-regions and corresponding arrays of plasmonic nanostructures may present a series of different images to a viewer so that an animation or image switch is visible upon tilting the device to cycle through the images displayed by those corresponding sub-regions. As will be described in more detail below, more than two sub-regions per image region may be used to increase the number of different images that may be displayed at respective different viewing angles. Where image switches or animations are provided, further images can increase the complexity of the image switch or provide a smoother animation with more frames. As an alternative to animations and image switches, the different images presented by the different sub-regions and corresponding diffractive structures may each be a different perspective of the same object and the views may be configured such that rotation of the security element gives the impression of a rotation of the object depicted in the images, and preferably it gives the impression of a corresponding rotation of the object depicted in the images. For example, if a rotation of 5° is required to switch from the first image to the second image, the first and second images may present different perspectives of the same object 5° apart. Again, it will be appreciated that more than two sub-regions may be used to provide more than two images and so increase the number of different views of the same object in such embodiments. As described elsewhere in this description, the form of the images may be freely configured, e.g. by changing the size, shape and/or spacing of the plasmonic nanostructures across the corresponding sub-regions. Similarly, the viewing angles at which these images appear may be controlled by the average inclination of the sub-regions.

As has been mentioned, plasmonic nanostructures typically require a metallic nanostructure provided adjacent to a dielectric material. In order to provide the colour generating effect over an area sufficiently large to be identified by the human eye, an array of many plasmonic nanostructures will typically be provided. Specific plasmonic nanostructures will be described in more detail below, but essentially plasmonic nanostructures include sub-wavelength one-dimensional and two-dimensional grating patterns, sub-wavelength two-dimensional arrays of nanoholes, and sub-wavelength two-dimensional arrays nanopillar antennae. Here, sub-wavelength should be interpreted as meaning having dimensions less than the wavelength of visible light, e.g. 500 nm or less.

In some embodiments, the first sub-regions may be visible at all angles at which the second sub-regions are visible. However, preferably, the average inclinations of the first sub-regions are such that the first image is substantially not displayed or only partially displayed (e.g. viewed obliquely) at least at the second viewing angle. In other words, the first image may dominate the appearance of the security element at the first viewing angle and the second image may dominate the appearance of the security element at the second viewing angle. In the most preferable embodiments, the second image is substantially not visible at the first viewing angle and the first image is substantially not visible at the second viewing angle. For example, the first and second sub-regions may be formed as different facets of a triangular prism shaped image region. It will be appreciated that there may be some angles at which both the first and second images are visible simultaneously, but at least one angle (the second viewing angle) at which the first image is not visible and at least one angle (the first viewing angle) at which the second image is not visible. These embodiments provide for an image switch type effect, which is a well-recognised security element effect that may be immediately authenticated by a user of the security element.

Preferably each first sub-region has substantially the same first average inclination and similarly preferably each second sub-region has substantially the same second average inclination (typically different from the first average inclination). This may provide, for example, a consistent image switch angle across the security element. However, in alternative embodiments, the first and/or second sub-regions may have average inclinations that vary across the security element. For example, the first and/or second sub-regions may have average inclinations that vary gradually across the security element such that the angle at which different portions of the first/second image becomes visible varies across the security element.

Where the average inclinations are consistent for both the first and second sub-regions, preferably the first and second average inclinations differ by at least 45°, preferably 60°, more preferably 90°. In many embodiments each first and/or second sub-region defines an average inclination relative to a plane of the security element of between 30° and 60°, preferably approximately 45°. Lower inclination angles provide for viewing closer to the normal, but may also result in more viewing angles over which both the first and second sub-regions are visible. Higher inclination angles provide for fewer viewing angles over which both the first and second sub-regions are visible, but have optimum viewing angles further from the normal to the security element.

Preferably, the first surface is arranged to define an array of facets, each facet constituting a respective sub-region of the array of image regions. Further preferably, the first surface is arranged to define an array of substantially planar facets in or on which is provided the first and second arrays of plasmonic nanostructures, each substantially planar facet constituting a respective sub-region of the array of image regions.

As has been mentioned, the way in which plasmonic nanostructures generate colour is such that they are typically visible over a wide range of viewing angles, with colour not being visible only at very acute viewing angles, therefore the first and second images will typically be visible over respective viewing angle ranges, influenced by the inclinations of the sub-region. Therefore, in many embodiments, the average inclinations of the first sub-regions are such that the first image is displayed over a first viewing angle range and the average inclinations of the second sub-regions are such that the second image is displayed over a second viewing angle range, wherein the first and second viewing angle ranges do not overlap or only partially overlap one another. The viewing angles may not overlap or only partially overlap, for example, when the inclinations of the sub-regions are very steep. In some embodiments a partial overlap may be used by providing first and second images that when viewed together form a complete image. For example, the first image may be of a "£" symbol and the second image a numeral "5" positioned such that in the viewing angles which overlap a complete "£5" is visible to the viewer. Alternatively, the first image may be the same as the second image but in a different colour such that a colour shifting effect is produced, owing to the different colours contributing to the appearance of the security element at different viewing angles.

Preferably, the array of image regions comprises a regular array of image regions. Preferably the image regions are substantially the same shape and have substantially the same size on the first surface as one another and are equally spaced from one another. This is preferable to give the device an even and uniform appearance, however in alternative embodiments the image regions could be arranged in an irregular manner and/or have different shapes or sizes.

In many embodiments, the array of image regions comprises a one-dimensional array of image regions. For example, the array of image regions may comprise an array of elongate image regions, each elongate image region extending in a first direction along the first surface, the array of elongate image regions being arranged along a second direction along the first surface substantially perpendicular to the first direction along the first surface. Typically, each elongate image region is divided lengthwise into at least the first and second sub-regions. Here, the first and second sub-regions are essentially interlaced in one direction (the second direction). In these embodiments, the sub-regions essentially correspond to slices of the first and second images. When viewed at the corresponding viewing angles, the plasmonic nanostructures in the first and/or second sub-regions will contribute to the appearance of the element. Where the sub-regions are on a scale not discernible by the human eye, this will appear to the viewer as if the first and/or second image is provided across the whole of the security element. Such embodiments may be used to replicate so-called one-dimensional lenticular security elements. That is, the first sub-regions, when viewed at angles at which their plasmonic nanostructures are visible, may combine to provide the element with a first appearance and the second sub-regions, when viewed at angles at which their plasmonic nanostructures are visible, may combine to provide the element with a second appearance.

In alternative embodiments, the array of image regions comprises a two-dimensional array of image regions. In these cases, for example, each image region may act as a pixel in building up an overall image, that pixel being variable depending on viewing angle owing to different inclinations in corresponding sub-regions providing that different arrays of plasmonic nanostructures are visible at different viewing angles.

As mentioned a particularly preferable way of arranging the first surface is so as to define in each image region a respective element in the form of a triangular prism (being triangular in cross-section taken perpendicular to the plane of the security element), wherein a first facet of each triangular prism element provides a corresponding first sub-region of the respective image region and a second facet of each triangular prism element provides a corresponding second sub-region of the respective image region. Alternatively, the image region may be truncated to form an upper facet parallel with the plane of the security element and located between the two inclined facets. These structures are particularly suited to one-dimensional arrays of image regions, providing facets that are visible at different viewing angles upon rotation about an axis parallel with the long axis of the image regions.

In embodiments comprising two-dimensional arrays of image regions, preferably the first surface is arranged so as to define in each image region a respective element in the form of pyramid or truncated pyramid, and wherein a first facet of each element provides a corresponding first sub-region of the respective image region and wherein a second facet of each element provides a corresponding second sub-region of the respective image region. It will be appreciated that each facet defined by the element may be used as a respective sub-region with its own array of plasmonic nanostructures. While these types of structures are preferable, any structure that provides different arrays of plasmonic nanostructures visible at different viewing angles may be used.

In order to increase the visual complexity of the security element, preferably each image region further comprises a third sub-region, wherein the first surface is arranged such that each third sub-region has a respective average inclination, and typically each third sub-region has substantially the same third average inclination. In some embodiments, each third sub-region is substantially parallel with a plane of the security element. In these embodiments the first and second sub-regions may be inclined in opposite directions away from parallel with the plane of the security element. Preferably, the first surface is arranged such that each third sub-region comprises a substantially planar facet.

In many embodiments, the first surface is arranged such that third sub-regions are visible at least at a third viewing angle, the third viewing angle being different from the first and second viewing angles, typically between the first and second viewing angles. Particularly preferably, the first second and third viewing angles define a plane of viewing angle variation. By arranging these viewing angles so as to define a plane of viewing angle variation, a more complex optically variable effect can be exhibited by the security element, with three sub-regions contributing to the appearance of the security element as it is tilted. The third sub-region may comprise a uniform structure provided across the third sub-regions defining a neutral image, wherein the uniform structure preferably comprises a substantially planar reflective surface, an array of anti-reflective microstructures (such as moth-eye structures or matte structures), a uniform array of plasmonic nanostructures defining a uniform colour, or one or more diffraction gratings, for example. Achromatic microstructures are particularly preferably, and other specific examples include an array of diffraction gratings defining red, green and blue pixels that provide overall a white appearance. Since the first and second images may be visible over relatively wide viewing angle ranges, a neutral image between those images may help to separate the first and second images from one another. In other embodiments, a third array of plasmonic nanostructures is provided in or on the first surface across the third sub-regions, the third array of plasmonic nanostructures defining in each third sub-region a corresponding portion of a third image. Three different images can increase the complexity of the optically variable effect exhibited by the security element. The average inclinations of the third sub-regions are preferably such that the third image is displayed at least at a third viewing angle and preferably such that the third image is substantially not displayed at least at the first viewing angle and/or at least at the second viewing angle. Again it will be appreciated, this requires that at least one angle exists at which the first or second image is visible and the third image is not, but it may be the case that, at other angles, the images are visible simultaneously.

In some embodiments, which may have either one or two-dimensional arrays of image regions, and may have two or more sub-regions, the first surface is arranged such that each first and/or second sub-region is substantially convex. A convex surface element acts to direct light with a single incoming incidence angle over a cone of viewing angles and so increase the visibility of the first and second images. The first and second sub-regions could be formed by independent surface arrangements, however, preferably the first surface is arranged so as to define a substantially convex surface element in each image region and each first sub-region is a first sub-region of a corresponding substantially convex surface element and wherein each second sub-region is a second sub-region of the corresponding substantially convex surface element. Here, the first and second sub-regions are essentially provided by different areas of the same convex surface element. This provides a convenient way of forming the differently inclined sub-regions. Indeed, a single continuously convex surface element may be divided up into as many sub-regions as desired, with corresponding plasmonic nanostructure arrays being arranged across each set of sub-regions across the array of image regions so as to provide more graduated image variation, i.e. more image channels. Preferably, in these embodiments, the convex image regions provide that each sub-region is itself convex, e.g. the image region is a continuously curved surface portion. Preferred surface elements would include substantially semi-cylindrical surface elements and substantially semi-spherical surface elements. These embodiments may carry images that are the same but in different colours across the sub-regions so as to present a gradual colour-shift effect. Alternatively, each sub-region within each image region may carry a respective image portion, e.g. an image slice, of a corresponding image such that at a first viewing angle, the first sub-regions exhibit a first image in combination and at a second viewing angle, the second sub-regions exhibit a second and different image in combination.

As mentioned, convex sub-regions may be employed in either one or two-dimensional arrays of image regions. Where a one dimensional array of image regions is provided, the sub-regions may be convex along one direction, typically the repeat direction of the image regions. For example, each image region may define a substantially semi-cylindrical surface element, with the semi-cylindrical surface element being divided lengthwise into two or more sub-regions that carry corresponding portions of respective images defined by respective arrays of plasmonic nanostructures. These images may then be switched between by rotating the security element about an axis parallel with the length of the semi-cylindrical surface elements, such that different respective sub-regions of the semi-cylindrical surface elements are visible across the device at each viewing angle. For a two-dimensional array, on the other hand, each image region may be convex along two orthogonal directions (e.g. the repeat directions of the array of image regions), and each image region may define a two-dimensional array of convex sub-regions having different average inclinations, each set of sub-regions comprising a respective array of plasmonic nanostructures defining corresponding portions of a respective image, such that the different images are exhibited at different viewing angles in two orthogonal directions of tilt of the security element by the corresponding sub-regions in combination. For example, each image region may define a substantially semi-spherical or aspherical surface element, with the semi-spherical or aspherical surface element being divided into a two-dimensional array of, for example, four or more sub-regions, which therefore have inclinations that differ along two orthogonal directions. The four or more images defined by plasmonic nanostructure arrays in these sub-regions may then be viewed individually by tilting the security element in two orthogonal directions of tilt.

Where convex sub-regions are used, whether they be as part of one or two-dimensional arrays of image regions, the thickness of the security element may be minimised by using a surface shaped to define a diverging Fresnel mirror. A diverging Fresnel mirror is essentially an arrangement of facets that substantially replicate the surface of a convex mirror, but eliminate the unnecessary thickness towards the centre of the mirror arrangement by providing each facet at substantially the same height. This structure operates on the same principle as Fresnel lenses, which are well known in the art. These structures have the advantage of reduced thickness compared with the convex structure they emulate. The facets of a so-called diverging Fresnel mirror are preferably convex to more accurately replicate a convex structure, but could also be substantially planar to approximate respective areas of the replicated convex structure.

Convex sub-regions may be particularly preferably employed where the sub-regions exhibit image effects such as animations, image switches, or apparent rotation of an object, as described above. In particular, convex sub-regions may present a more continuous appearance of the effect across a range of viewing angles corresponding to the convex direction of the sub-regions.

The plasmonic nanostructures of the first, second and/or third arrays of plasmonic nanostructures may be discontinuously provided across the corresponding first, second and/or third sub-regions to provide image information of the corresponding first, second and/or third image. That is, their presence and absence may be used to define the image in much the same way the presence and absence of ink defines a printed image. Additionally or alternatively, the plasmonic nanostructures of the first, second and/or third arrays of plasmonic nanostructures may vary in at least one of their shape, size and spacing across the corresponding first, second and/or third sub-regions to provide image information of the corresponding first, second and/or third image. Here "shape" refers to the outline of the nanostructure, i.e. the metal cover and/or the dielectric material, "size" refers to the dimensions of the nanostructure and "spacing" refers to the lateral distance between the centres of adjacent nanostructures. Each of these factors affects the colour generated by a region of the plasmonic nanostructure. This phenomenon is described in "Plasmonic Color Palettes for Photorealistic Printing with Aluminum Nanostructures", Shawn J. Tan et al., Nano Letters, 2014, 14 (7), pp 4023-4029, DOI: 10.1021/nl501460x. Varying shape, size and/or spacing of the plasmonic nanostructures can be used to provide colour information of the image, e.g. provide regions of different colours, thereby allowing production of full-colour images with integral registration between the colours.

Plasmonic nanostructures have sizes on the nanoscale and so sub-regions can be provided with very small dimensions and furthermore very high resolution images can be produced. Preferably, each first and/or second sub-region has a width on the first surface of 5 to 50 µm, preferably 10 to 40 µm. It is preferable that the sub-regions themselves remain larger than the diffraction limit, but are small enough that they are individually imperceptible to the naked eye. Further it is preferable that the periodicity of the sub-regions is also on a scale imperceptible to the naked eye so that the gaps between sub-regions of one set cannot be resolved. The sizes of plasmonic nanostructures enable sub-regions to be produced on this scale.

As mentioned above, there are a number of preferred types of plasmonic nanostructures. In some preferred embodiments, the first and/or second array of plasmonic nanostructures (and/or the third array, if provided) comprises a two-dimensional array of nanopillars, each nanopillar comprising a dielectric body topped by a continuous metal cover layer and typically further having a complementary metallic layer surrounding the base of the nanopillar with metallic hole as a back reflector. A further continuous metal layer, such as a layer of aluminium, may be provided beneath the dielectric layer. Such pillars may be circular in horizontal cross-section, or may have other shapes such as square or oval. As has been mentioned, the shape may be configured to affect the colour generated by the array of plasmonic nanostructures. These nanopillars may have a diameter (largest width) in the range 10 to 500 nm.

In other preferred examples, the first and/or second array of plasmonic nanostructures comprises a continuous metal base layer, a continuous dielectric layer on the continuous metal base layer and a two-dimensional array of metallic nanodiscs on the continuous dielectric layer. Again, the nanodiscs may have shapes such as circle, square or oval and may have a diameter (largest width) in the range 10 to 500 nm.

In other preferred examples, the first and/or second array of plasmonic nanostructures comprises a two-dimensional array of nanoholes, each nanohole comprising an aperture through a metal layer, the metal layer being arranged on a substrate, such as a dielectric substrate, and typically a continuous metal layer being provided beneath the dielectric substrate. The nanohole could also extend into the dielectric substrate, or could only be through the metal layer. For example, the hole may be formed in a UV curable material as typically used for cast cure replication of surface relief micro-structures, or could simply be etched into the metal. Typical substrate materials include acrylated oligomers such as acrylic esters of polyesters, polyethers, polyurethanes and epoxy resins. Alternatively, the hole may be formed in suitable thermoplastic materials often based on acrylic (PMMA) or urethane chemistries. The nanohole may further comprise a metal layer at the base of the nanohole. For example, the metal layer may be applied to a formed substrate using directional deposition.

As discussed, plasmonic nanostructures typically comprise metal and dielectric components. Therefore, preferably, the first layer of the security element is a first dielectric layer and preferably the first and/or second arrays of plasmonic nanostructures are formed in the first surface of the first dielectric layer. For example, the nanopillars are formed in the surface of this dielectric layer, i.e. by shaping the dielectric layer and then applying the required metal portion. In other embodiments, the dielectric layer is uniform and provided with metal nanodiscs or a metal layer with nanoholes on the surface of the dielectric layer.

Especially where the plasmonic nanostructures are nanopillars or nanoholes, a continuous metal layer coating regions of the first surface may be provided between the plasmonic nanostructures of the first and/or second arrays of plasmonic nanostructures. That is, where the plasmonic nanostructures comprise, for example, nanopillars, the first surface between each nanopillar or nanohole may comprise a coating of a continuous metal layer, thereby defining the backreflector hole.

According to a second aspect of the present invention, there is provided a method of manufacturing a security element comprising: providing a first layer having a first surface forming the first surface of the first layer so as to define an array of image regions across the first surface, each image region comprising at least a first sub-region and a second sub-region, wherein, each sub-region has a respective average inclination; providing in or on the first surface across the first sub-regions a first array of plasmonic nanostructures defining in each first sub-region a corresponding portion of a first image; and providing in or on the first surface across the second sub-regions a second array of plasmonic nanostructures defining in each second sub-region a corresponding portion of a second image; wherein the average inclinations of the first sub-regions are such that the first image is displayed at least at a first viewing angle and wherein the average inclinations of the second sub-regions are such that the second image is displayed at least at a second viewing angle different from the first viewing angle and such that the second image is substantially not displayed at least at the first viewing angle.

It will be appreciated that this method may be adapted to produce a security element including any the above preferable features.

In particular, preferably, forming the first surface of the first layer so as to define an array of image regions further comprises forming the first surface of the first layer so as to provide at least part of the first and second arrays of plasmonic nanostructures in the first surface across the first and second sub-regions. That is, the inclinations of the sub-regions and typically the dielectric part of the first and second arrays of plasmonic nanostructures are formed in the same step. This may be, for example, forming a dielectric layer so as to include the inclinations and arrays of nanopillars or nanoholes. This allows integral registration between the sub-regions and the plasmonic nanostructures in those sub-regions. This simultaneous formation may be performed, for example, by using a cast-cure process. The first layer may be a first layer of curable material and forming the first surface of the first layer comprises casting the first surface of the first layer so as to define the structure and curing the first layer so as to fix the structure in the first surface of the first layer. The casting surface may be formed so as to define the inclinations and the arrays of nanostructures (typically the dielectric part) by writing designing an appropriate casting surface, for example, using e-beam lithography.

As mentioned above, plasmonic nanostructures typically comprise a dielectric and metallic component and so preferably providing the first and second arrays of plasmonic nanostructures comprises providing on the first surface of the first layer a dielectric portion of the array of plasmonic nanostructures or forming in the first surface of a dielectric first layer a dielectric portion of the array of nanostructures and providing a metallic portion of the array of plasmonic nanostructures. Providing the metallic portion of the array of plasmonic nanostructures may comprise depositing a metal layer using an electron beam evaporator, which directionally deposits metal so that, for example, a metal nanodisc is formed on the tops on nanopillars.

More details concerning the formation of plasmonic nanostructures may be found in "Plasmonic Color Palettes for Photorealistic Printing with Aluminum Nanostructures", Shawn J. Tan et al., Nano Letters, 2014, 14 (7), pp 4023-4029, DOI: 10.1021/n1501460x; "Color generation via subwavelength plasmonic nanostructures", Yinghong Gu et al., Nanoscale, 2015, 7, pp 6409-6419, DOI: 10.1039/C5NR00578G; "Plasmonic colour generation", Anders Kristensen et al., Nat. Rev. Mater. 2, 16088, (2016), pp 1-14, DOI: 10.1038/natrevmats.2016.88; Cheng, F. et al. "Structural color printing based on plasmonic metasurfaces of perfect light absorption". Sci. Rep. 5, 11045; doi: 10.1038/srep11045 (2015); Clausen, J. S. et al. "Plasmonic Metasurfaces for Coloration of Plastic Consumer Products". Nano Letters 14, 4499-4504, doi:10.1021/n15014986 (2014); Roberts, A. S., Pors, A., Albrektsen, O. & Bozhevolnyi, S. I. Subwavelength Plasmonic Color Printing Protected for Ambient Use. Nano Letters 14, 783-787, doi:10.1021/n1404129n (2014).

BRIEF DESCRIPTION OF THE DRAWINGS

Examples of security elements will now be described with reference to the accompanying drawings, in which.

DETAILED DESCRIPTION

A security element according to a first embodiment will now be described with reference to FIGS. 1 to 6B.

Figure 1:
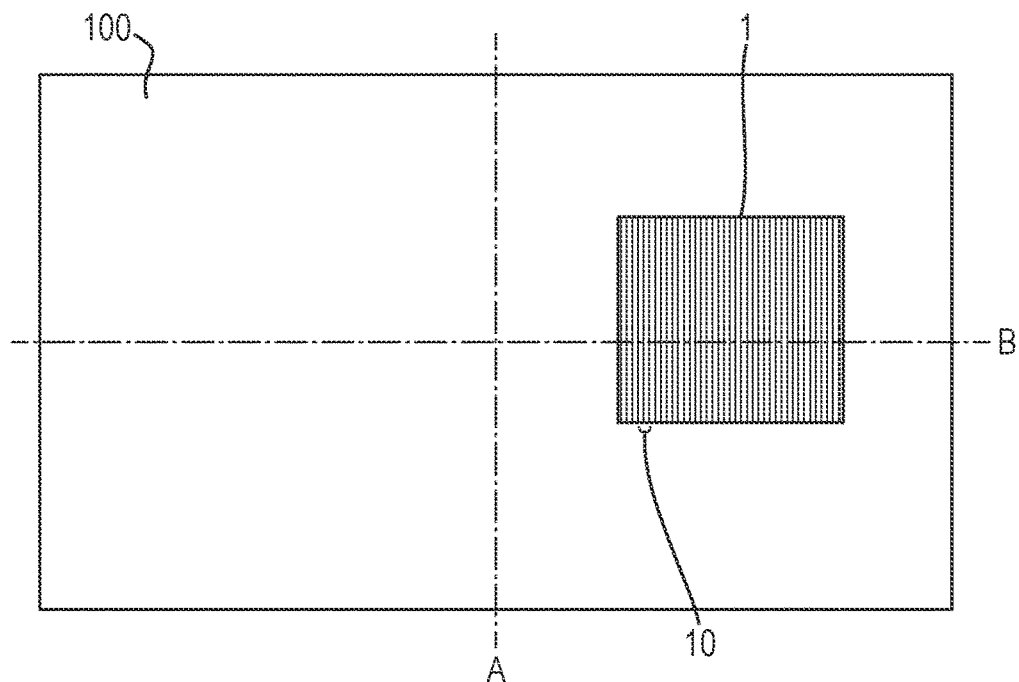
FIG. 1 shows, schematically, a security document including a first embodiment of a security element.

FIG. 1 shows a security document 100, in this case a banknote, with a security element 1. The security document has a short axis A and a long axis B perpendicular to the short axis. The security element has a first surface that faces away from the security document. This first surface is made up of an array of image regions 10, in this case elongate image regions, each elongate image region extending in a first direction, i.e. along the direction of the axis A. The array of elongate image regions are arranged so as to repeat along a second direction along the surface, i.e. along the direction of axis B, the image regions repeating so as to provide the width of the security element.

Figure 2:
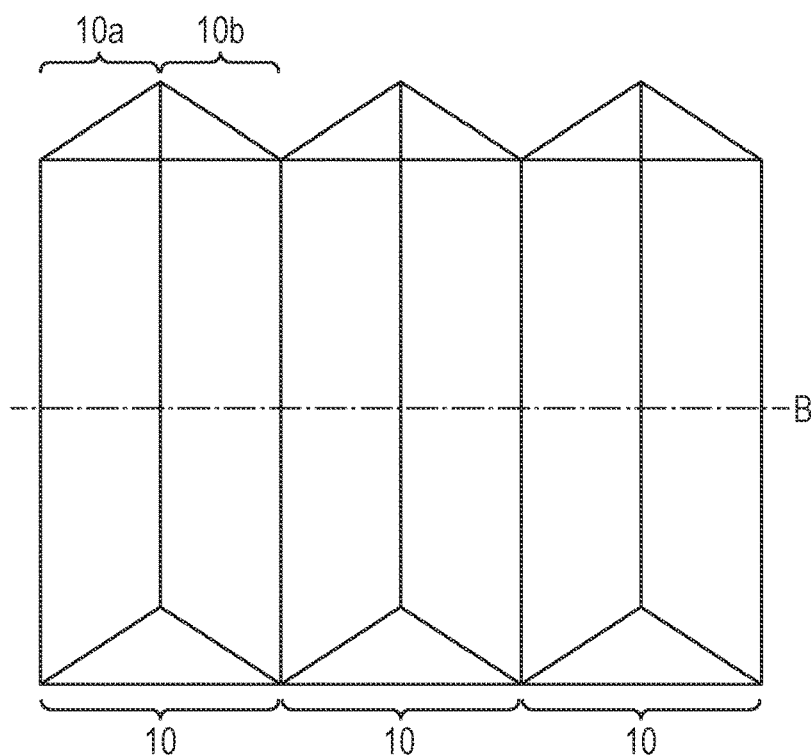
FIG. 2 shows, schematically, a perspective view of an enlarged portion of the security element according to the first embodiment.

FIG. 2 shows a small area of the security element, illustrating the arrangement of the surface of the security element across three image regions 10 in a perspective view. As can be seen in this figure, each image region has an elongate triangular prism shape, providing each image region with two facets facing away from the security document. The triangular prism is elongate along the direction of axis A (which corresponds to the first direction mentioned above) and has substantially constant cross-section as viewed along the direction of axis B (which corresponds to the second direction mentioned above). FIG. 2 shows only three image regions 10, but it will be appreciated that many more are typically used to make up the full security element. Each image region 10 has a respective first sub-region 10a, being a facet that is inclined away from being parallel with the security document towards the viewer's left. Each first sub-region 10a across the image regions 10 has substantially the same inclination such that the first sub-regions all have the same effect on the angle of incidence of light. Each image region also has a respective second sub-region 10b, being a facet that is inclined away from being parallel with the security document towards the viewer's right. Again, all inclinations are substantially the same for each second sub-region 10b.

In FIG. 2, the inclinations shown are purely schematic and the actual angle the facet makes to the surface of the document will be selected so that over a desired range of viewing angles the facets forming the first sub-regions obscure the facets forming the second sub-regions and vice versa to provide optical variability. This will be discussed in more detail below, but essentially, sub-regions will become obscured at least when the viewing angle becomes parallel to the surface of the sub-region and the information in those sub-regions will cease to be visible. Sub-regions may cease being visible before the viewing angle becomes parallel with the surface in the sub-regions as some plasmonic nanostructures exhibit their colours poorly at very steep viewing angles.

Figure 3:
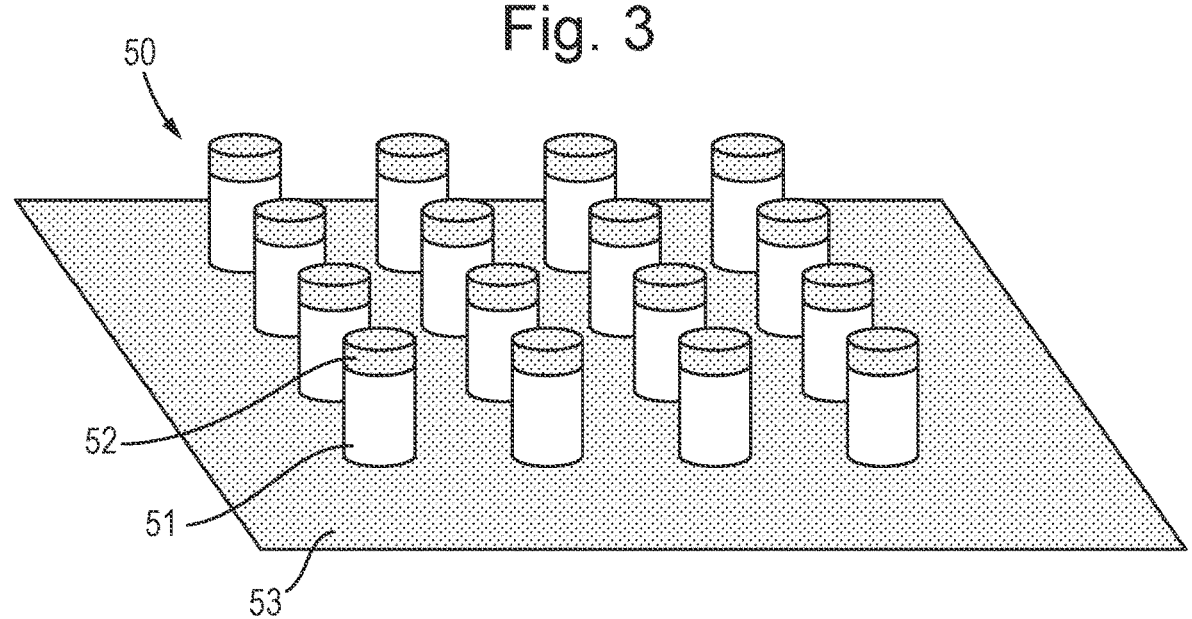
FIG. 3 shows, schematically, an enlarged perspective view of an array of plasmonic nanostructures suitable for use in the security element according to the first embodiment.

FIG. 3 shows an array of plasmonic nanostructures 50 suitable for use in the present invention. The array of plasmonic nanostructures 50 is in the form of nanopillars. Each nanopillar sits on a uniform metal base layer 53 that extends across the security element surface. Each nanopillar comprises a dielectric shaft 51 that in this Figure is shown as being generally cylindrical. Each nanopillar is topped with a metal cover layer 52 that forms a nanodisc on the top of the cylindrical shaft. The metal base layer 53 and metal nanodiscs may be of aluminium, while the shafts of the nanopillars may be formed of hydrogen silsesquioxane (HSQ), for example, where the substrate is formed by electron beam replication. Alternatively, for roll to roll or sheet fed replication, the pillar may be formed in a UV curable material typically used for cast cure replication of surface relief micro-structures, such as acrylated oligomers, such as acrylic esters of polyesters, polyethers, polyurethanes and epoxy resins, or formed in thermoplastic resins based on acrylic (PMMA) or urethane chemistries. While these are preferred, other material combinations are known to be suitable for forming plasmonic nanostructures. Typical dimensions of nanopillar include diameters between 10 and 500 nm and spacings of 50 to 500 nm. While the nanopillars shown in this figure are all the same shape and size and equally spaced, it will be appreciated that the desired colour to be generated can be tuned by mixing different sizes and shapes of nanopillar and varying the spacing. Only 16 nanopillars are shown in FIG. 3, but it will be appreciated that many more are typically used across the sub-regions of the present security device.

Figure 4:
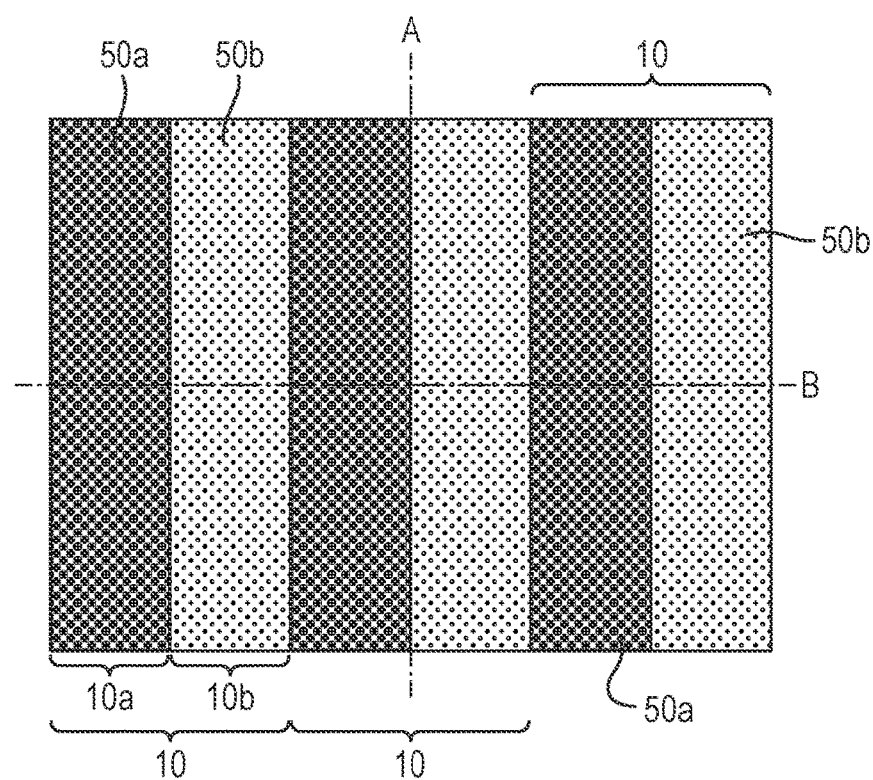
FIG. 4 shows, schematically, an enlarged plan view of the security element according to the first embodiment including the plasmonic nanostructures on the surface.

FIG. 4 shows the arrangement of plasmonic nanostructures across the security element. In this case, a first array of plasmonic nanostructures 50a, being nanopillars having a particular shape, size and spacing, are provided across each of the first sub-regions 10a, which correspond to those facets inclined towards the viewer's left. Similarly, a second array of plasmonic nanostructures 50b, being nanopillars having a particular shape, size and spacing different from that of the first array 50a, are provided across each of the second sub-regions 10b, which correspond to those facets inclined towards the viewer's right.

Figure 5A:
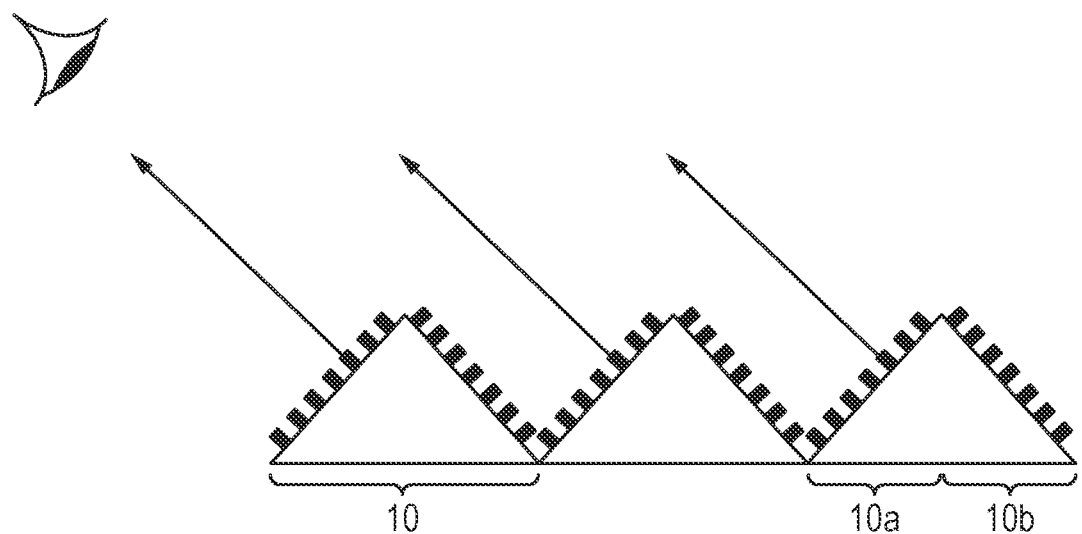
FIGS. 5A and 5B show, schematically, a portion of the security element of the first embodiment in cross-section at two different viewing angles.
Figure 5B:
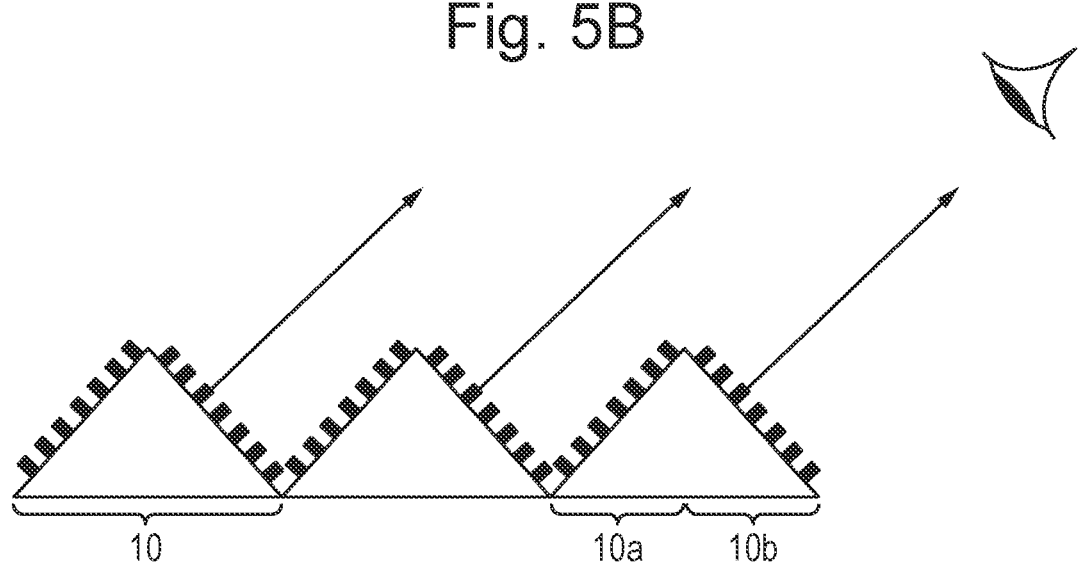
Figure 6A:
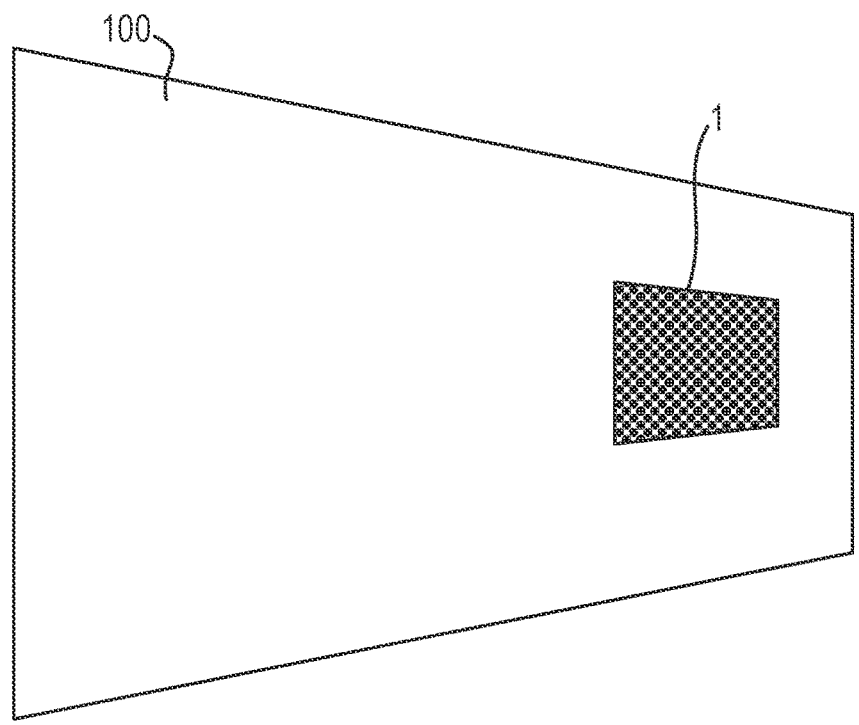
FIGS. 6A and 6B show, schematically, the security document including the security element of the first embodiment at two different viewing angles.
Figure 6B:
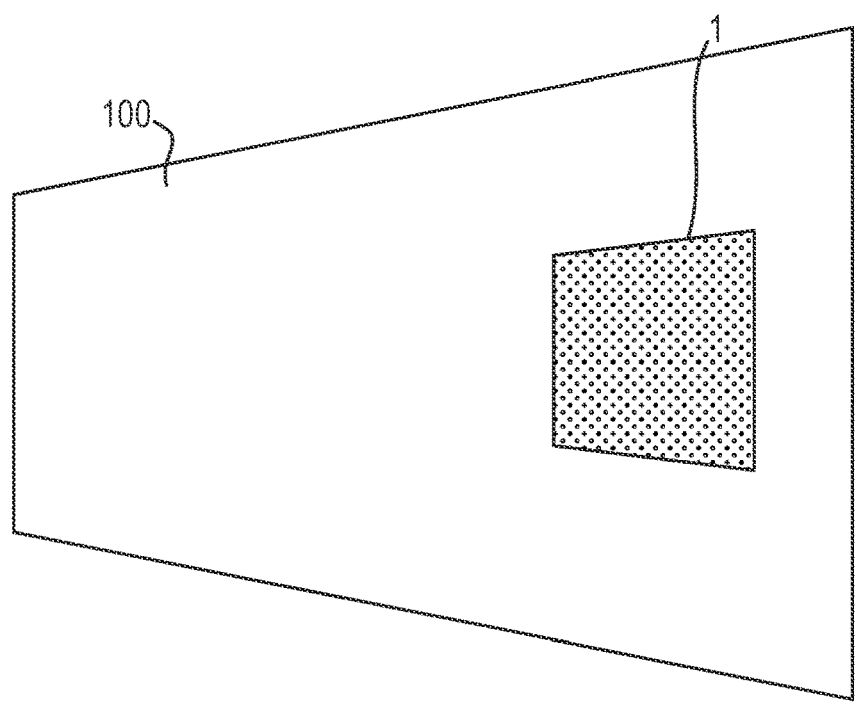

FIGS. 5A to 6B illustrate the appearance of the security element when viewed at different viewing angles upon rotation about the axis A. FIGS. 5A and 6A relate to a security element rotated about axis A such that the left-hand side of the document is closer to the viewer than the right-hand side. This effectively rotates the security element 1 about the long axis of the image regions 10 such that the first sub-regions 10a are visible while the second sub-regions 10b are obscured. The viewing geometry is shown in FIG. 5A in particular. Here, the viewing angle relative to the surface defining the second sub-regions 10b is effectively beyond 90° such that the second sub-regions are not visible. In this embodiment, the image regions have widths on a scale imperceptible to the human eye and hence, as shown in FIG. 6A, the appearance of the security element is of a uniform colour as generated by the first array of plasmonic nanostructures 50a. FIGS. 5B and 6B relate to the security element rotated about axis A such that the right-hand side of the document is closer to the viewer than the left-hand side. This effectively rotates the security element 1 about the long axis of the image regions 10 such that the second sub-regions 10b are visible while the first sub-regions 10a are obscured. The viewing geometry is shown in FIG. 5B and is essentially the reverse of FIG. 5B such that the viewing angle of the first sub-regions 10a is effectively beyond 90° such that the first sub-regions are not visible. Now, as shown in FIG. 6B, the appearance of the security element is of a uniform colour as generated by the second array of plasmonic nanostructures 50b.

Figure 7:
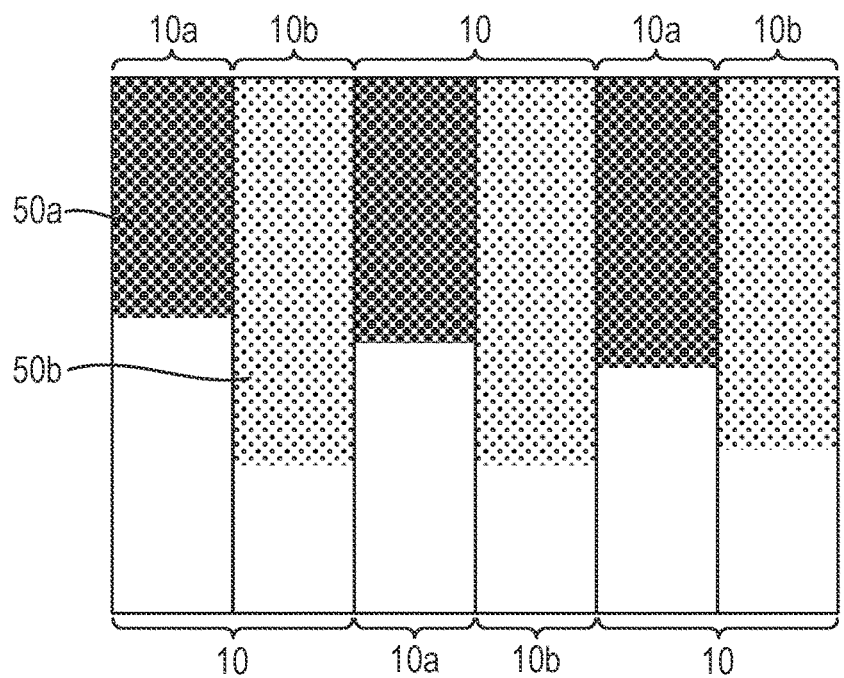
FIG. 7 shows, schematically, an enlarged plan view of a security element according to a second embodiment including the plasmonic nanostructures on the surface.

While the first embodiment shows the arrays of plasmonic nanostructures provided entirely across each of the respective sets of first sub-regions 10a and second sub-regions 10b, it will be appreciated that this simplicity is merely to aid in understanding the effects utilised in the invention. In practice the arrays of plasmonic nanostructures in these sub-regions may be provided only in certain areas of the sub-regions and/or may be modulated (i.e. varied in size, shape and/or spacing) across the sub-regions. FIGS. 7 to 8C illustrate an embodiment in which the plasmonic nanostructures are only in certain areas of the sub-regions.

In this embodiment, the same triangular prismatic shape defining sets of first and second sub-regions 10a, 10b is used as in the first embodiment. FIG. 7 shows these triangular prismatic image regions 10 in plan view, to illustrate the manner in which the plasmonic nanostructures are provided. Specifically, it shows that the first array of plasmonic nanostructures 50a in the first sub-regions 10a is only provided in certain areas of those sub-regions so as to define an image 60a, in this case a circle. That is, each first sub-region 10a corresponds to a slice of the image to be displayed 60a and the first array 50a is provided in each first sub-region 10a so as to delimit the corresponding slice of the circle in that image. Similarly, the second array of plasmonic nanostructures 50b in the second sub-regions 10b is only provided in certain areas of those sub-regions so as to define a second image 60b, in this case a triangle. That is, each second sub-region 10b corresponds to a slice of the image to be displayed 60b and the second array 50b is provided in each second sub-region 10b so as to delimit the corresponding slice of the triangle in that image. In this embodiment, again, different plasmonic nanostructures are used between the first and second sub-regions to provide different colours. For both sets of sub-regions, the areas not including the first and second arrays of plasmonic nanostructures are left empty such that no colour effect is exhibited at any viewing angle in those regions.

Figure 8A:
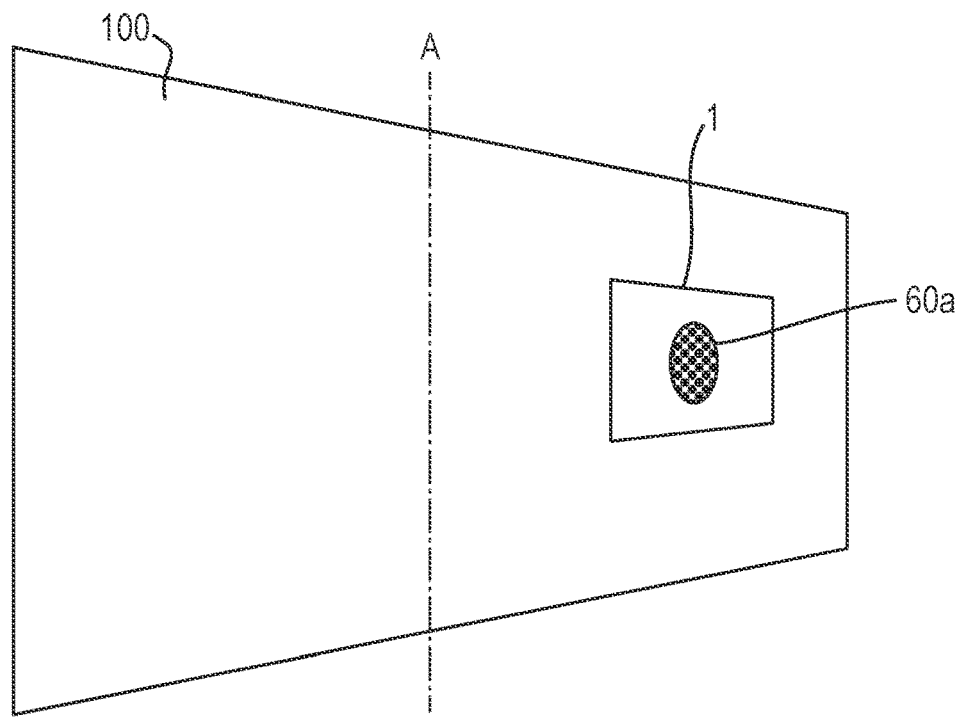
FIGS. 8A to 8C show, schematically, a security document including the security element of the second embodiment at three different viewing angles.
Figure 8B:
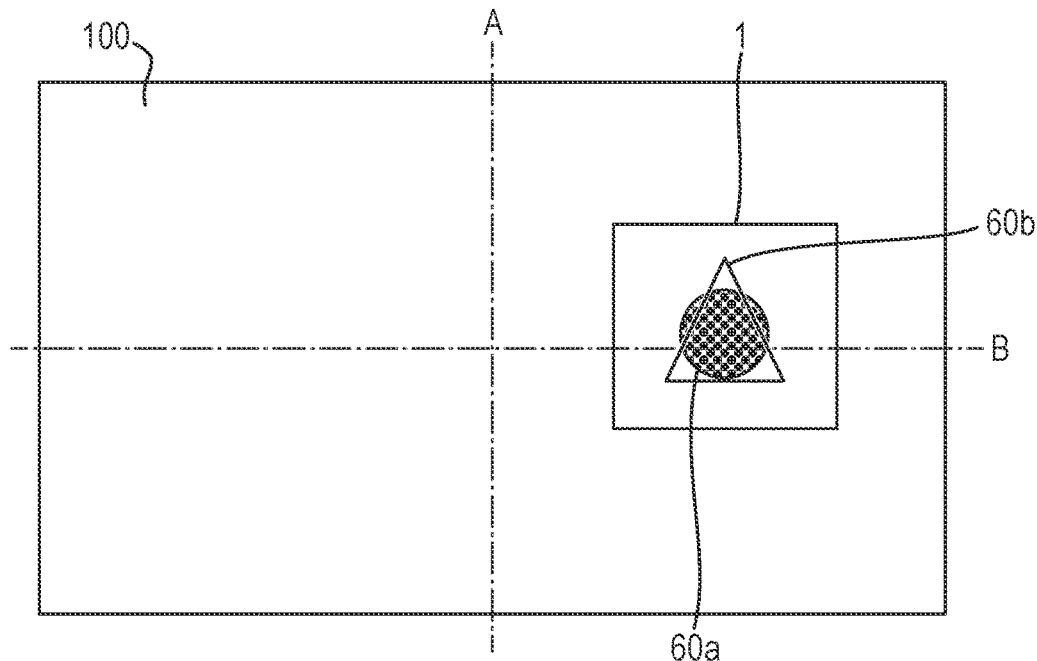
Figure 8C:
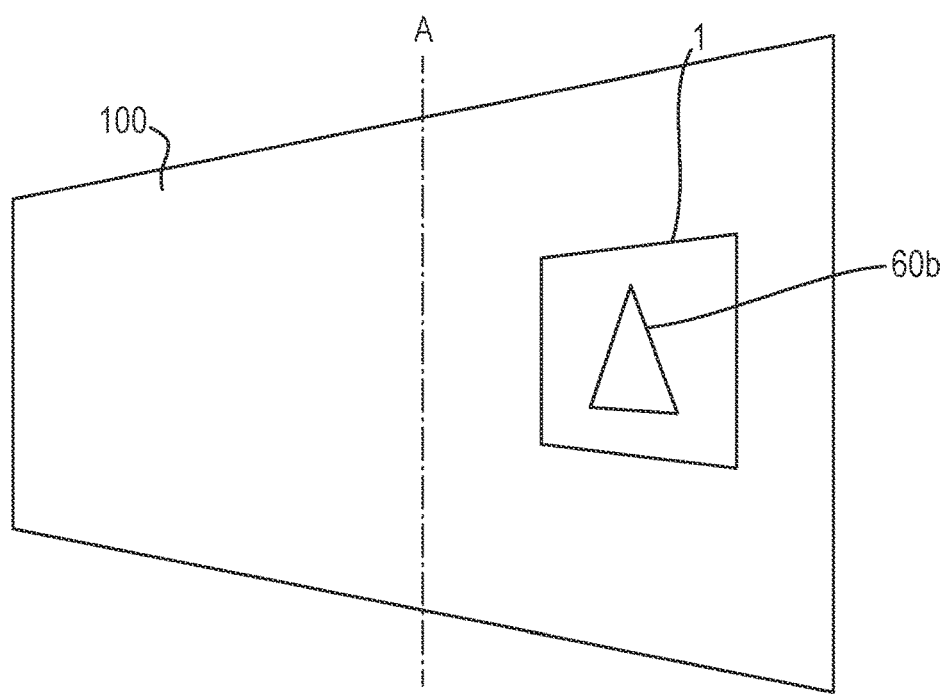

FIGS. 8A to 8C illustrate the appearance of the security element 1 on a security document 100. FIG. 8A shows the security document 1 rotated about axis A such that the left-hand side of the document is closer to the viewer than the right-hand side, while FIG. 8B shows the security document 1 viewed perpendicularly, and FIG. 8C shows the security document rotated about axis A such that the right-hand side of the document is closer to the viewer than the left-hand side. As can be seen, when viewed in the position of FIG. 8A, the viewing angle relative to the surface defining the second sub-regions 10*b* is effectively beyond 90° such that the second sub-regions 10*b* are not visible, while the first sub-regions 10*a* are visible. Hence, the viewer sees the first image 60*a*, i.e. a circle. When viewed in the position of FIG. 8B, neither of the first or second sub-regions is obscured from view and so both the first and second images 60*a*, 60*b* are visible in superposition. That is, the images of a circle and a triangle are visible simultaneously. Finally, when viewed in the in the position of FIG. 8C, the viewing angle relative to the surface defining the first sub-regions 10*a* is effectively beyond 90° such that the first sub-regions are not visible, while the second sub-regions 10*b* become visible. Hence, the viewer sees the second image 60*b*, i.e. a triangle.

In the above embodiment, different images are used as the first and second images 60*a*, 60*b* such that the image changes upon rotation of the security element. As has been mentioned, this may involve some viewing angles at which both images are visible simultaneously. In some embodiments, the security element may be designed to take advantage of this feature by providing that the two images integrate in some way, e.g. by providing that the first image provides a first half of a combined image and the second image a second half of a combined image. However, in other embodiments, the first and second images may be provided defining substantially the same image but in different colours such that rotation of the security element produces an apparent colour change of the image as different amounts of the different arrays of plasmonic nanostructures are visible. Some embodiments that utilise this effect will be described further below.

Figure 9:
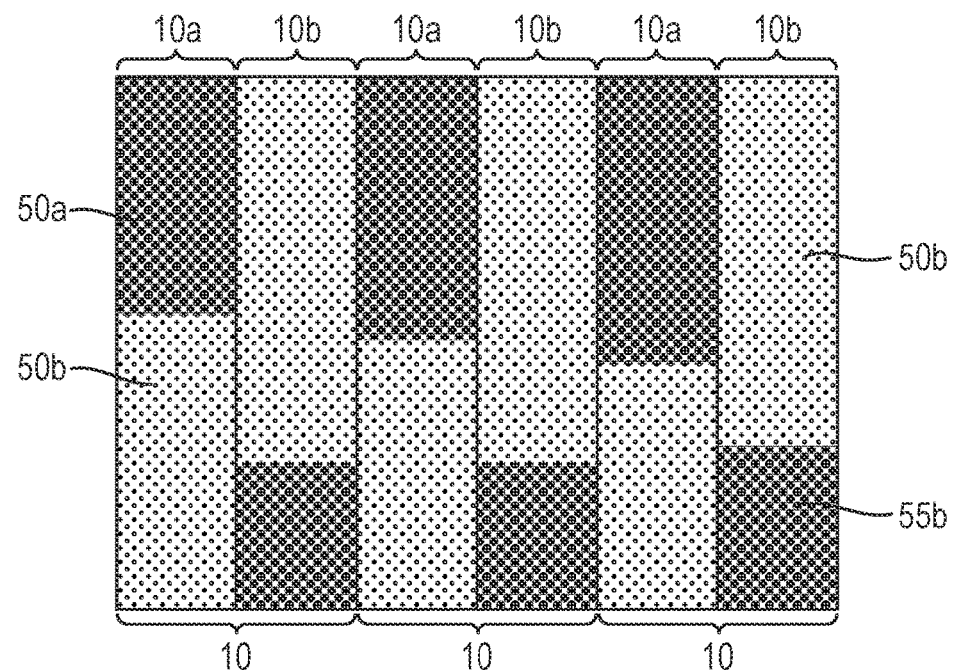
FIG. 9 shows schematically, an enlarged plan view of a security element according to a third embodiment including the plasmonic nanostructures on the surface.
Figure 10:
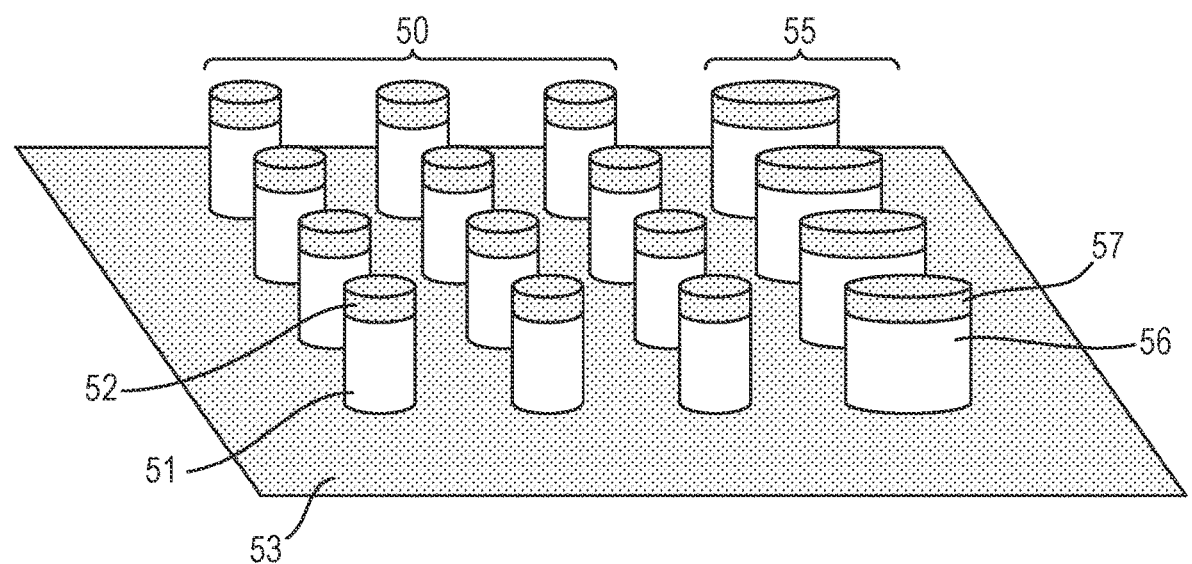
FIG. 10 shows, schematically, an enlarged perspective view of an array of plasmonic nanostructures suitable for use in the security element according to the third embodiment.

While in the above embodiment, the areas not including the first and second arrays of plasmonic nanostructures are left empty such that no colour effect is exhibited at any viewing angle in those regions, this is not essential. The embodiment of FIGS. 9 and 10 illustrate an embodiment in which the plasmonic nanostructures are modulated across the sub-regions 10*a*, 10*b*. That is, each first sub-region 10*a* is provided with an area of a first size, shape and spacing of plasmonic nanostructures 50*a* and an area of a second size, shape and spacing of plasmonic nanostructures 55*a*. Similarly, each second sub-region 10*b* is provided with an area of a third size, shape and spacing of plasmonic nanostructures 50*b* and an area of a fourth size, shape and spacing of plasmonic nanostructures 55*b*. These plasmonic nanostructures produce a colour effect depending on their size, shape and spacing and so each of these areas will appear a different colour. FIG. 10 illustrates this variation in the plasmonic nanostructures and shows first plasmonic nanostructures 50, comprising a dielectric shaft 51 and metal nanodisc 52 having a first diameter, and second plasmonic nanostructures 50, comprising a dielectric shaft 56 and metal nanodisc 57 having a second diameter. It will be appreciated that more complex modulation of the types of nanostructures can be used to produce images with more colour complexity, for example by providing many different combinations of variations in size, shape and spacing.

Figure 11A:
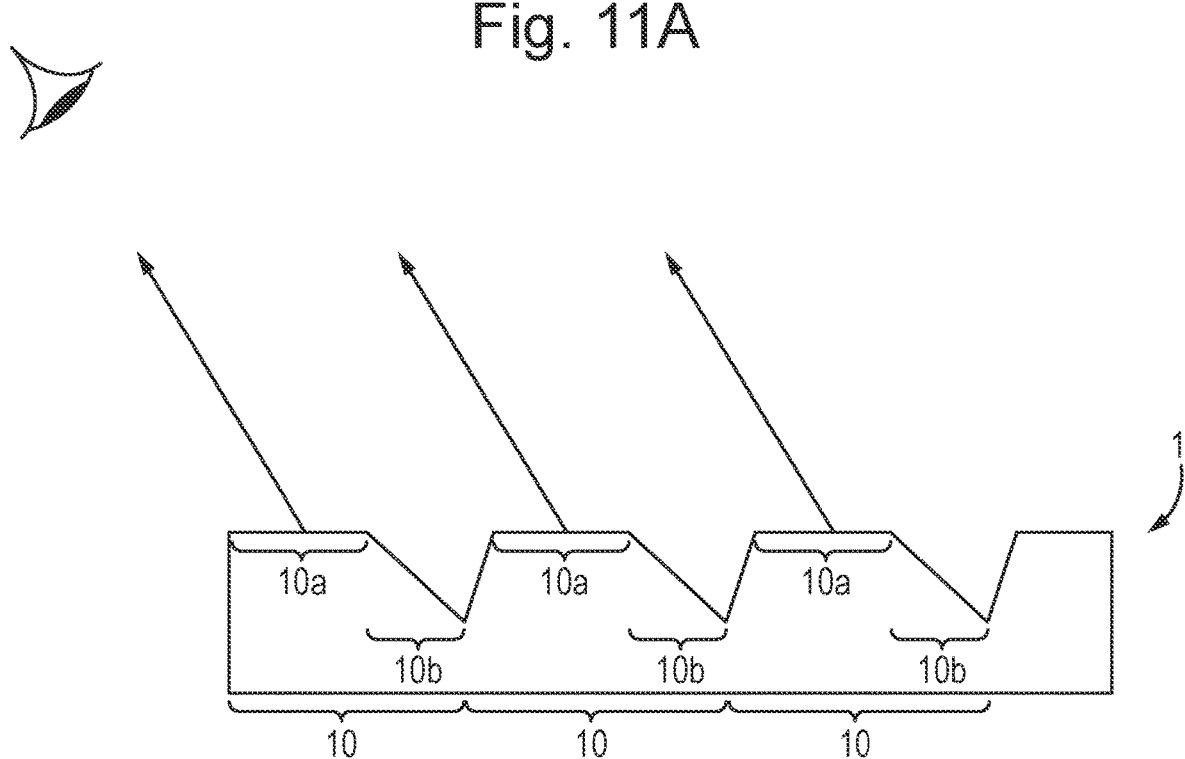
FIGS. 11A and 11B show, schematically, a portion of a security element of a fourth embodiment in cross-section at two different viewing angles.
Figure 11B:
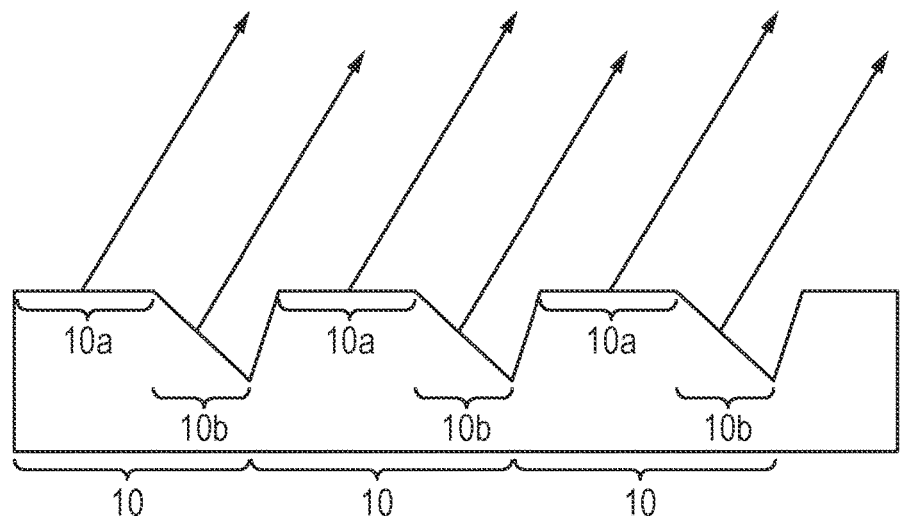

The above embodiments have described image regions 10 having a regular and generally triangular prismatic shape, however, it will be appreciated that many different arrangements of the first surface can be used depending on the desired optically variable effect. FIGS. 11A and 11B illustrate one option for the arrangement of the first surface. Here, the image element 1 is again formed of an array of interlaced, elongate image regions 10. Each image region 10 has a first sub-region 10*a*, being an area of the surface that is substantially parallel with the plane of the security element. Each image region 10 also has a second sub-region 10*b*, formed as one facet of a groove in the first surface, the facet being inclined away from parallel with the plane of the security element, towards the viewer's right. When the security element 1 is viewed with the left-hand side closer to the viewer than the right-hand side, as illustrated in FIG. 11A, the first sub-regions 10*a* are visible, but the second sub-regions 10*b* are obscured from view. Hence, only the colours generated by the plasmonic nanostructures in the first sub-regions 10*a* are visible to the viewer. However, when the security element is rotated so that the right-hand side is closer to the viewer than the left-hand side, as illustrated in FIG. 11B, the second sub-regions 10*b* become visible, together with the first sub-regions 10*a*. That is, since the first sub-regions 10*a* are parallel with the plane of the security element and arranged at the upper surface of the security element, the plasmonic nanostructures provided in the first sub-regions are visible over a very wide range of viewing angles as they are not obscured at substantially any viewing angle when the front surface of the security element is being viewed.

Figure 12A:
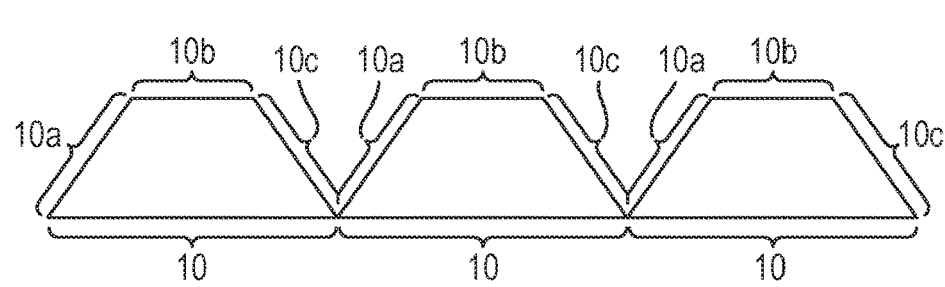
FIGS. 12A and 12B show, schematically, a portion of a security element of a fifth embodiment in cross-section and plan view respectively.
Figure 12B:
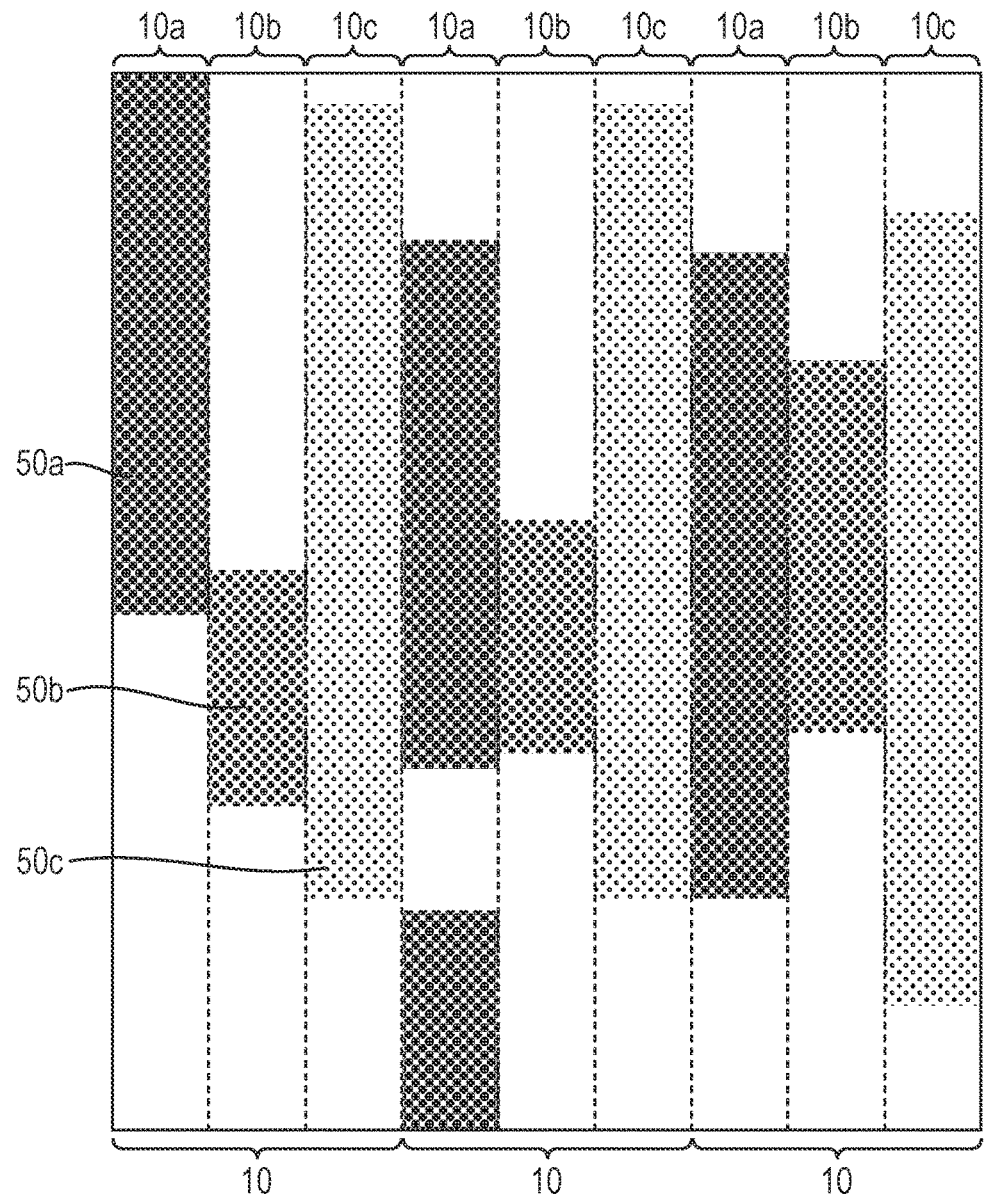

FIGS. 12A and 12B illustrate an embodiment with another arrangement of the first surface of the security element 1. Here, again we have an array of elongate image regions 10 being arranged so as to repeat along a direction perpendicular to their length. Each image region 10 has a trapezium-shaped cross-section, as shown in FIG. 12A, that is constant along the length of the image region 10. That is, three facets are defined in each image region 10 providing a first sub-region 10*a* that is inclined towards the viewer's left, a second sub-region 10*b* that is substantially parallel with the plane of the security element and a third sub-region 10*c* that is inclined towards the viewer's right. A first array of plasmonic nanostructures 50*a* are disposed across the first sub-regions 10*a* in accordance with a first image, a second array of plasmonic nanostructures 50*b* are disposed across the second sub-regions 10*b* in accordance with a second image and a third array of plasmonic nanostructures 50*c* are disposed across the third sub-regions 10*c* in accordance with a third image. This arrangement is shown for three image regions in FIG. 12B. This embodiment provides three different images that are visible over three different viewing angle ranges, increasing the complexity of the optically variable effect.

Figure 13:
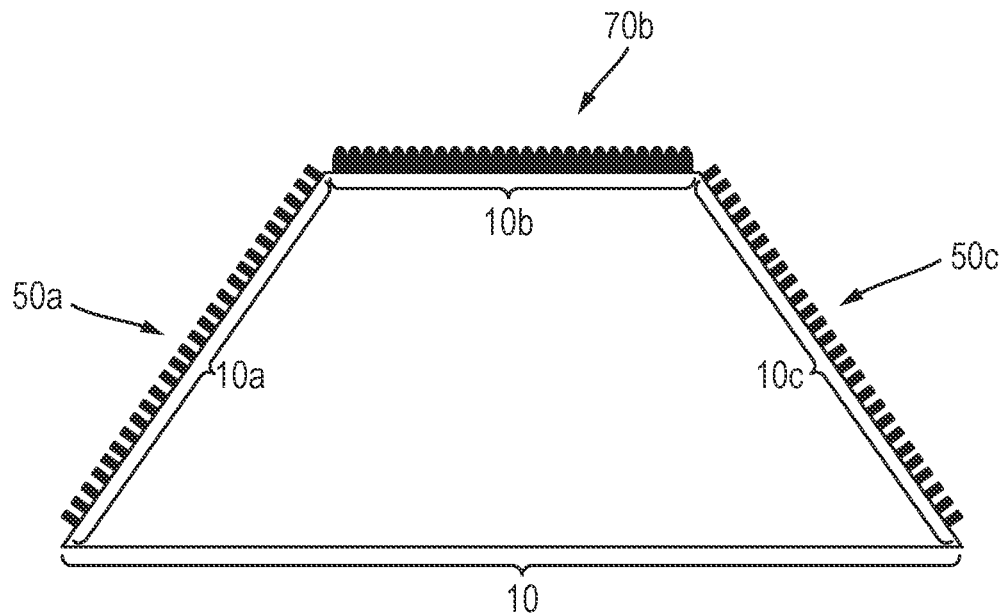
FIG. 13 shows, schematically, an enlarged portion of a security element of a sixth embodiment in cross-section.

The embodiment of FIGS. 12A and 12B increases visual complexity; however, it may be the case that for many viewing angles more than one image is visible at the same time. For example, there may be a large range of viewing angles over which the first and second images are visible simultaneously and similarly for the second and third images. It is possible that the images used could be designed so as to integrate with one another to take advantage of this. However, in some embodiments, it is preferred to minimise the viewing angles at which multiple images are visible. FIGS. 13 to 14C illustrate such an embodiment.

FIG. 13 shows a single image region 10 of a security element 1 in cross-section. The image region 10 has the same shape as in the embodiment of FIGS. 12A and 12B. That is, each image region 10 has a trapezium-shaped cross-section that is constant along the length of the image region 10. Again, the image regions 10 are arranged so as to repeat along a direction perpendicular to the length of the image region to form the security element with a plurality of image regions. The first sub-region 10*a* of each image region 10, which is inclined towards the viewer's left, is provided with a first array of plasmonic nanostructure 50*a* defining a corresponding portion of a first image 60*a*. Similarly, the third sub-region 10*c* of each image region 10, which is inclined towards the viewer's right, is provided with a third array of plasmonic nanostructure 50*c* defining a corresponding portion of a third image 60*c*. The second sub-region 10*b* of each image region 10, which is substantially parallel to the plane of the security element, is provided with a structure that defines a neutral image 60*b*. The structure may in some embodiments be an array of plasmonic nanostructures defining, for example, a uniform colour; however, in preferable embodiments, the structure is an anti-reflective structure. Specifically, in this embodiment, the second sub-region 10*b* of each image region 10 is completely filled with an array of anti-reflective moth-eye structures 70*b* defining the neutral image 60*b*.

Figure 14A:
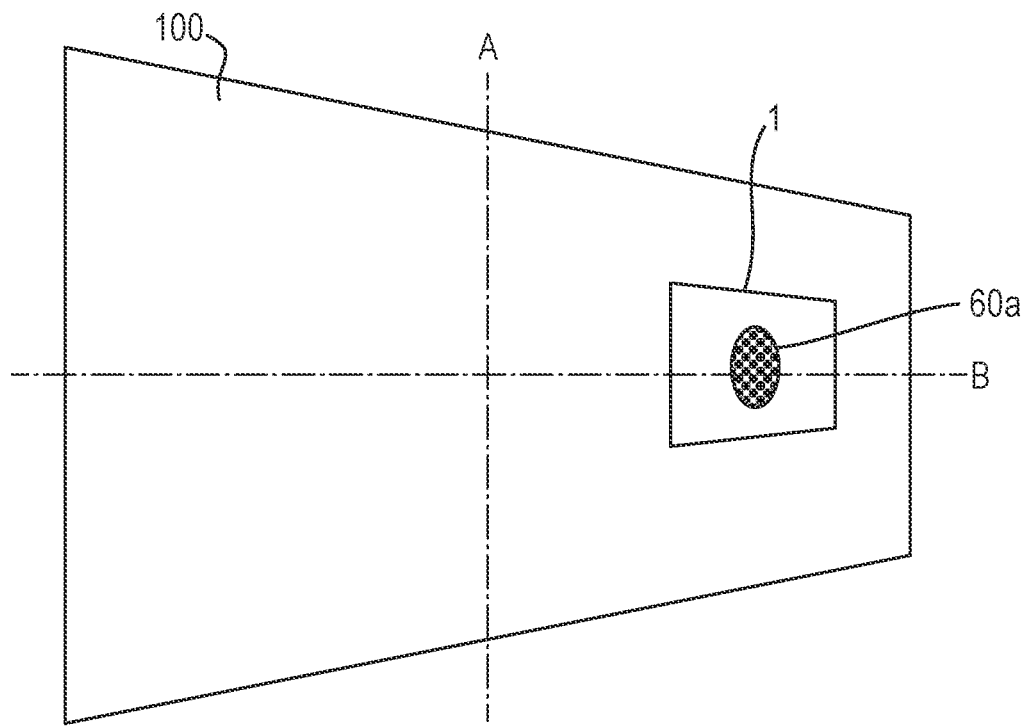
FIGS. 14A to 14C show, schematically, a security document including the security element of the sixth embodiment at three different viewing angles.
Figure 14B:
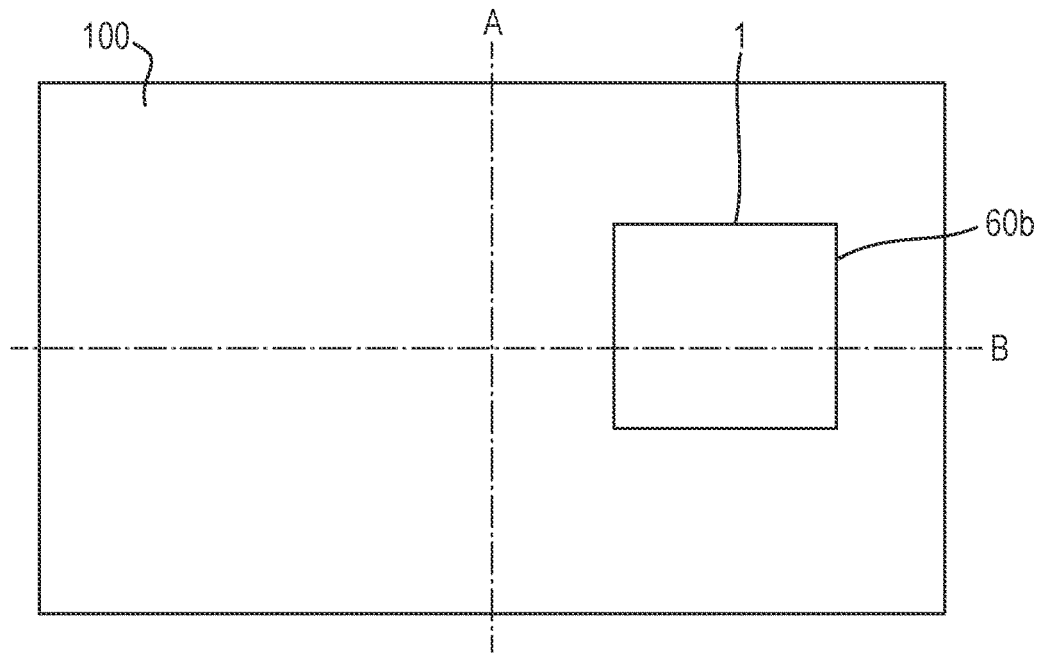
Figure 14C:
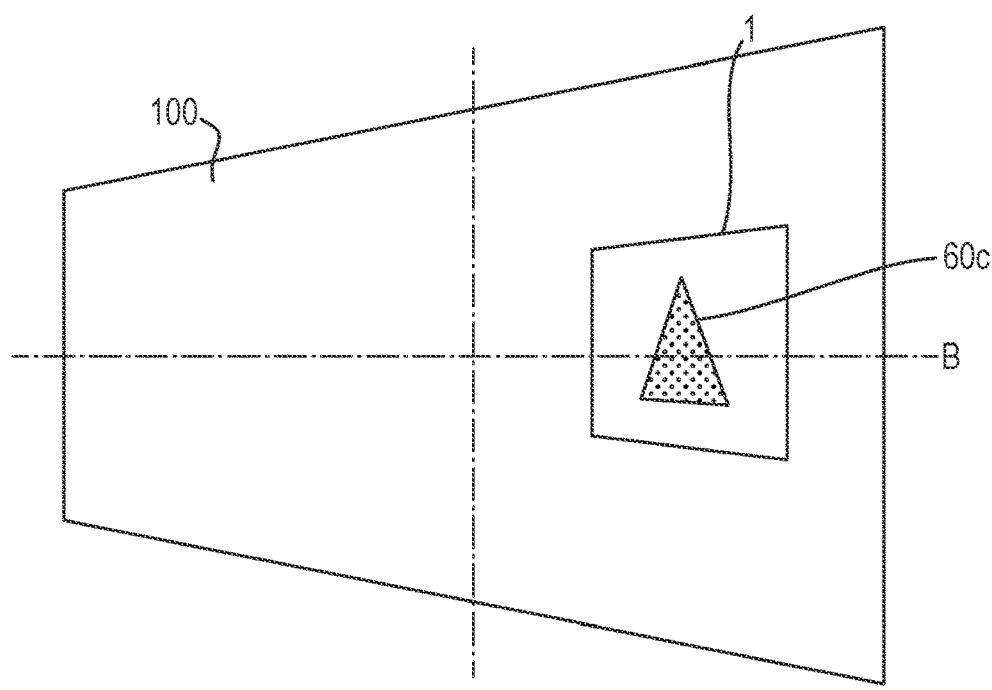

FIGS. 14A to 14C illustrate the appearance of the security element 1 on a security document 100. FIG. 14A shows the security document 1 rotated about axis A such that the left-hand side of the document is closer to the viewer than the right-hand side, while FIG. 14B shows the security document 1 viewed perpendicularly, and FIG. 14C shows the security document rotated about axis A such that the right-hand side of the document is closer to the viewer than the left-hand side. As can be seen, when viewed in the position of FIG. 14A, the viewing angle relative is such that the second and third sub-regions 10*b*, 10*c* are substantially not visible, while the first sub-regions 10*a* are visible. Hence, the viewer sees the first image 60*a*, in this case a circle. When viewed in the position of FIG. 14B, substantially only the second sub-regions 10*b* are visible. That is, the security element appears uniformly dark owing to the anti-reflective structures provided across the second sub-regions. Finally, when viewed in the in the position of FIG. 14C, the viewing angle is such that the first and second sub-regions are not visible, while the third sub-regions 10*c* become visible. Hence, the viewer sees the third image 60*c*, i.e. a triangle. Advantageously, even when the second sub-regions are visible simultaneously with the first or second sub-regions, since they comprise anti-reflective structures, they do not contribute significantly to the appearance of the device and the viewer perceives only the corresponding image carried by the first or third sub-regions 10*a*, 10*c*. The first and third images 60*a*, 60*c* are therefore visible distinctly and separately.

The above embodiments have focused on one-dimensional arrays of image regions in which the inclinations of the sub-regions contribute to variability in the direction of rotation about axis A. However, in other embodiments, two-dimensional arrays of image regions may be used and an example will now be described.

Figure 15:
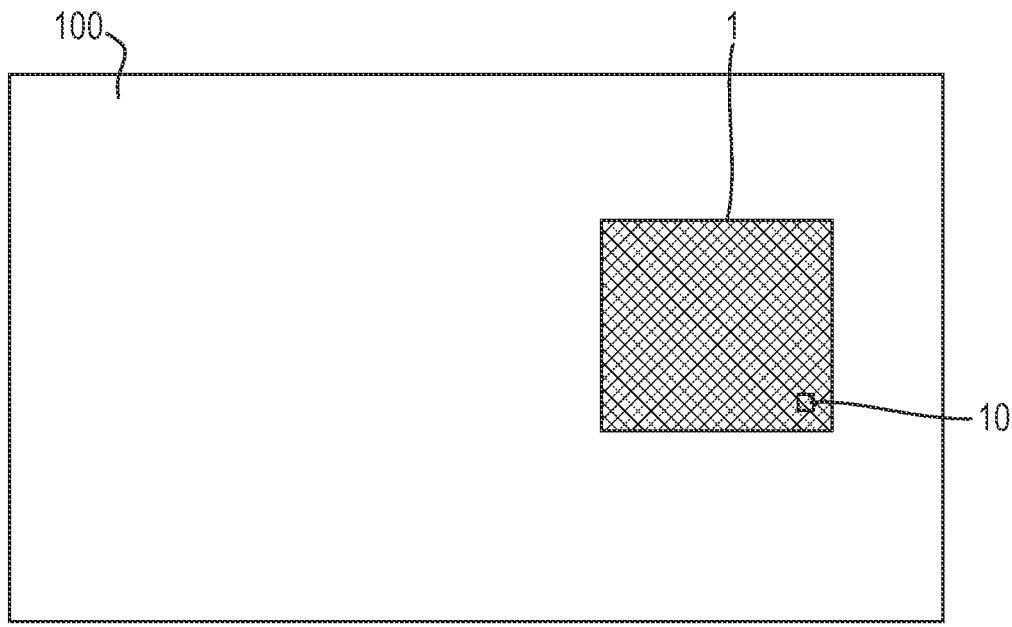
FIG. 15 shows, schematically, a security document including a seventh embodiment of a security element.
Figure 16A:
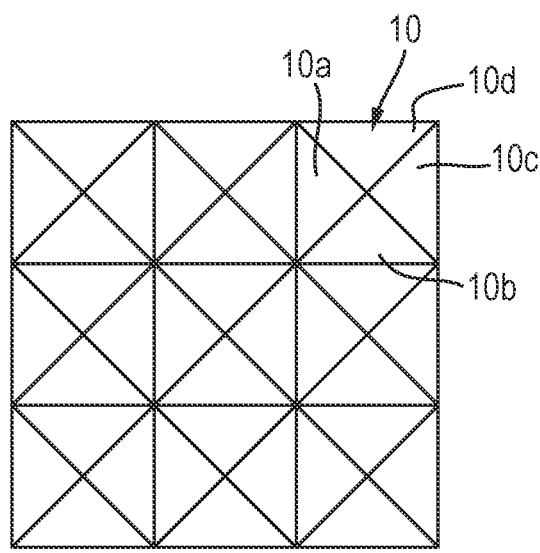
FIGS. 16A to 16C show, schematically, enlarged portions of the security element of the seventh embodiment.
Figure 16B:
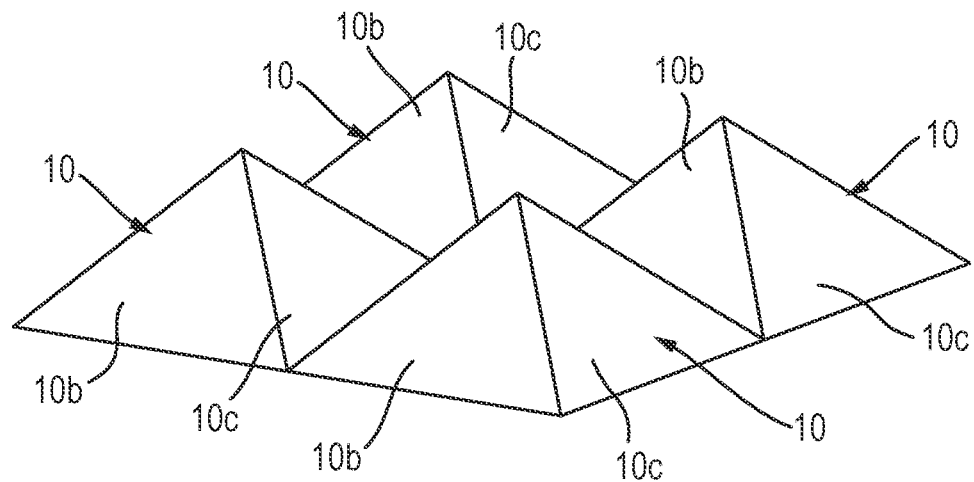
Figure 16C:
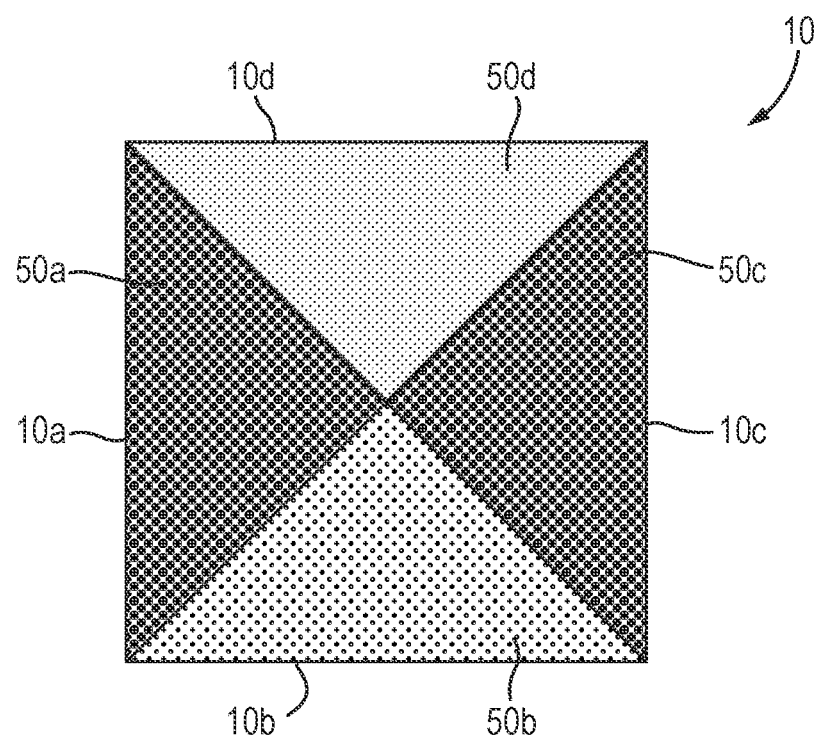

FIG. 15 shows a security document 100, again a banknote, with a security element 1. The security document has a short axis A and a long axis B perpendicular to the short axis. The security element has a first surface that faces away from the security document. This first surface is made up of a two-dimension array of image regions 10. The image regions are shown in more detail in FIGS. 16A to 16C. In this case, each image region 10 is shaped as a square based pyramid such that each image region 10 has four facets providing four different sub-regions 10*a*, 10*b*, 10*c*, 10*d*. Again, it should be appreciated that the angle of inclinations of these facets shown in the Figures is schematic and the inclinations used will be selected for the desired viewing angle ranges of the plasmonic nanostructures. As can be seen in FIG. 16A, the first sub-region 10*a* is provided by a facet facing towards the viewer's left, the second sub-region 10*b* is provided by a facet facing downwards, the third sub-region 10*c* is provided by a facet facing towards the viewer's right and the fourth sub-region is provided by a facet facing upwards. As shown in FIG. 16C, each sub-regions 10*a*, 10*b*, 10*c*, 10*d* is provided with a corresponding array of plasmonic nanostructures 50*a*, 50*b*, 50*c*, 50*d*, disposed according to respective first to fourth images 60*a*, 60*b*, 60*c*, 60*d*. In this embodiment, the plasmonic nanostructures are shown as being present across the whole of the sub-regions (i.e. the images are uniformly coloured areas); however, this is merely for ease of demonstration and it will be appreciated that the nanostructures may be selectively provided across only certain sub-regions and certain areas of sub-regions in accordance with more complex image information and can also be modulated across the sub-regions so as to vary colour. When this security document is viewed, the security element will exhibit a colour effect at four different viewing angles according to the plasmonic nanostructures on the different facets in each image region 10. These four different viewing angles are separated by rotation about both axis A and B, providing the security element with optical variability in two orthogonal directions of rotation, and this is shown in FIGS. 17A to 17D.

Figure 17A:
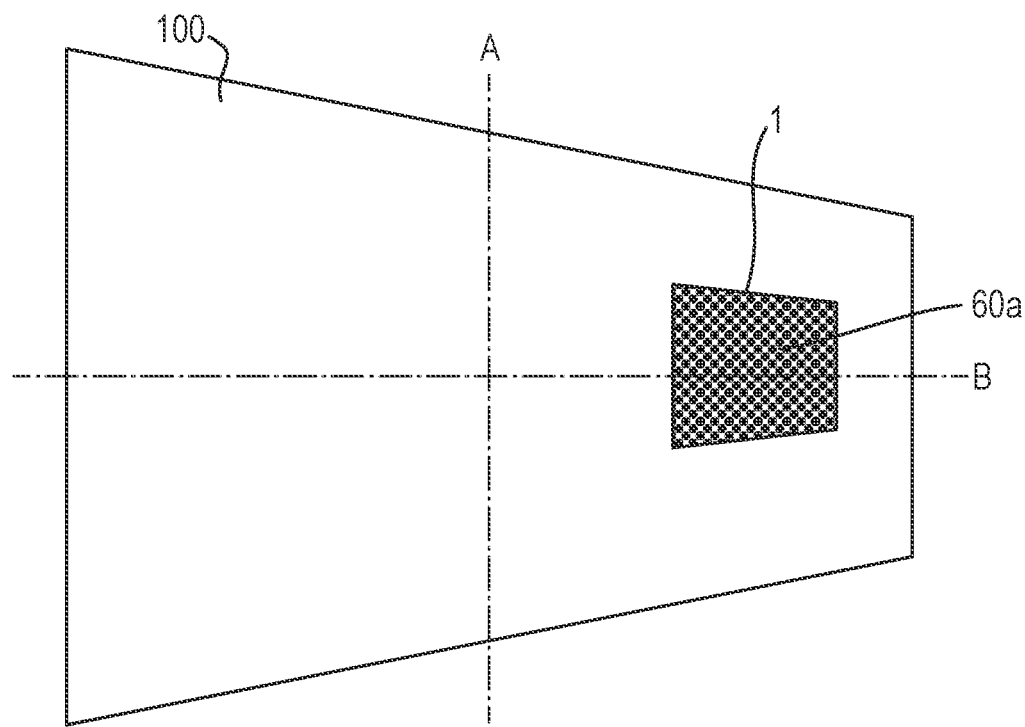
FIGS. 17A to 17D show, schematically, a security document including the seventh embodiment of the security element at four different viewing angles.
Figure 17B:
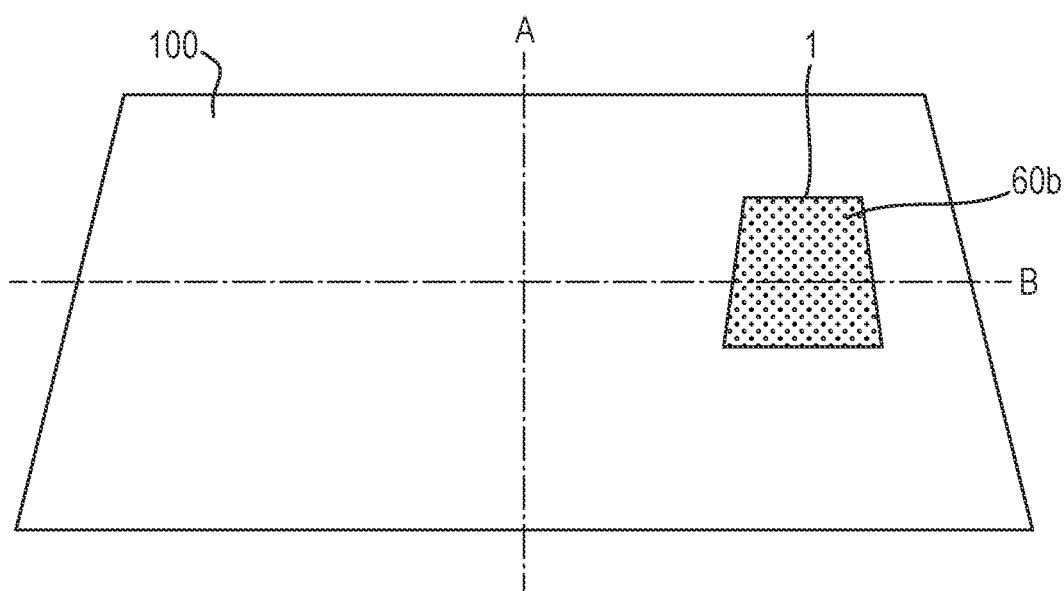
Figure 17C:
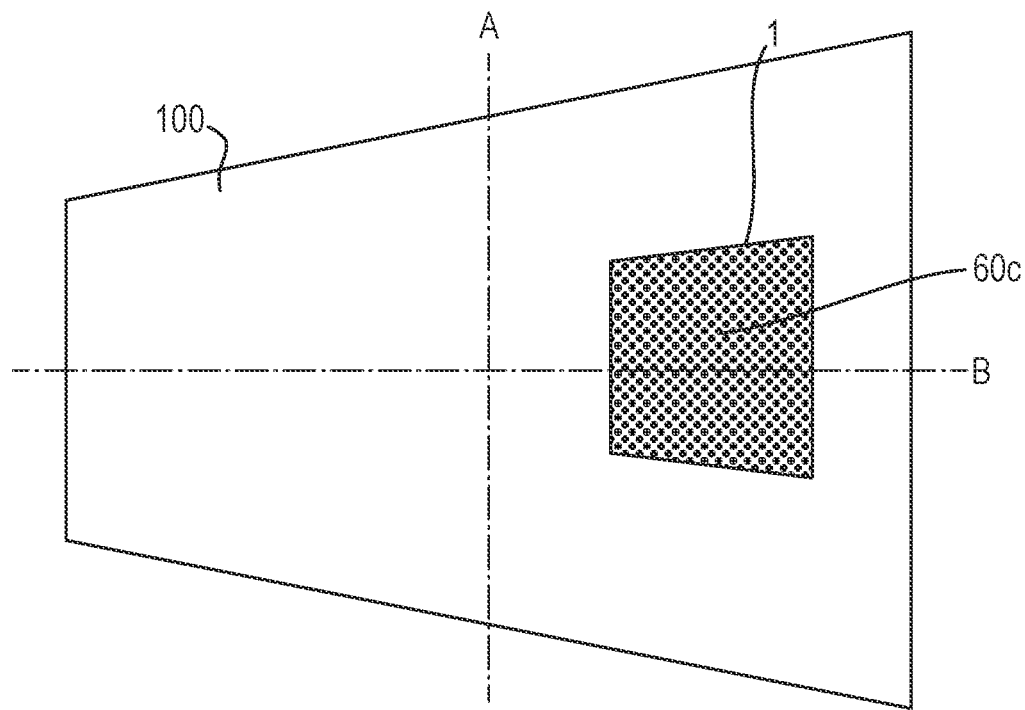
Figure 17D:
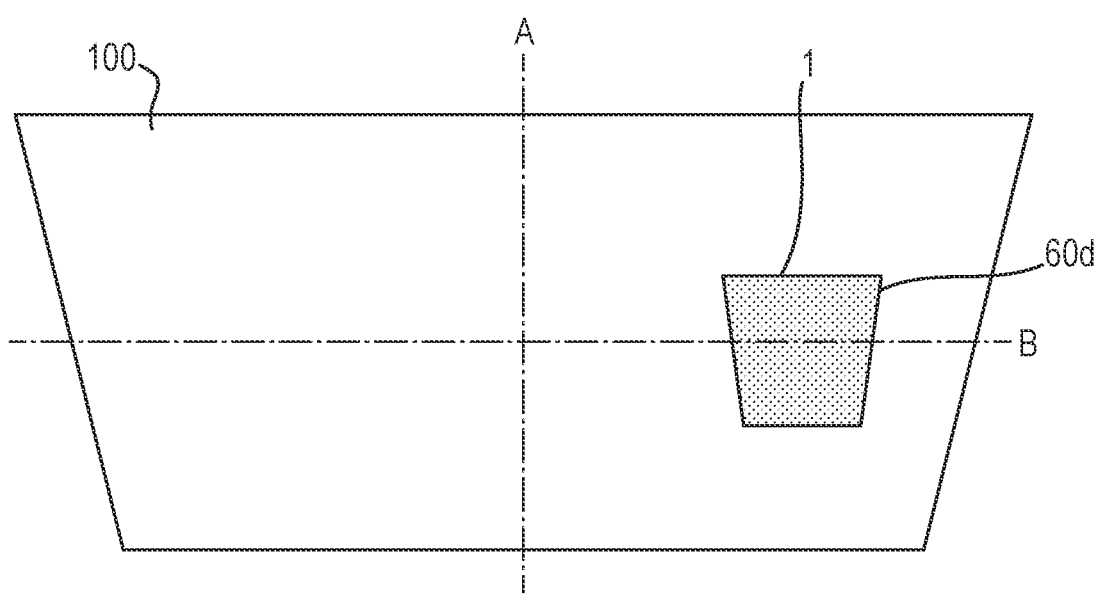

FIG. 17A shows the security element rotated from perpendicular viewing about axis A so that the left-hand side is closer to the viewer than the right-hand side. Here substantially only the first sub-region is visible and so only the colour from the first array of plasmonic nanostructures 50*a* is exhibited to the viewer, displaying the first image 60*a*. FIG. 17B shows the security element rotated from perpendicular viewing about axis B so that the bottom of the security document is closer to the viewer than the top. Here substantially only the second sub-region 10*b* is visible and so only the colour from the second array of plasmonic nanostructures 50*b* is exhibited to the viewer, displaying the second image 60*b*. FIG. 17C shows the security element rotated from perpendicular viewing about axis A so that the right-hand side is closer to the viewer than the left-hand side. Here substantially only the third sub-region is visible and so only the colour from the third array of plasmonic nanostructures 50*c* is exhibited to the viewer, displaying the third image 60*c*. Finally, FIG. 17D shows the security element rotated from perpendicular viewing about axis B so that the top of the security document 100 is closer to the viewer than the bottom. Here substantially only the fourth sub-region is visible and so only the colour from the fourth array of plasmonic nanostructures 50*d* is exhibited to the viewer, displaying the fourth image 60*d*. The result is a security element that exhibits optical variability in two orthogonal directions or rotation.

It will be appreciated that other shapes of image regions can be used in two-dimensional variants of the invention. For example, the pyramidal shape can be truncated to provide an upper facet that is parallel with the plane of the security element for carrying a neutral image.

Figure 18:
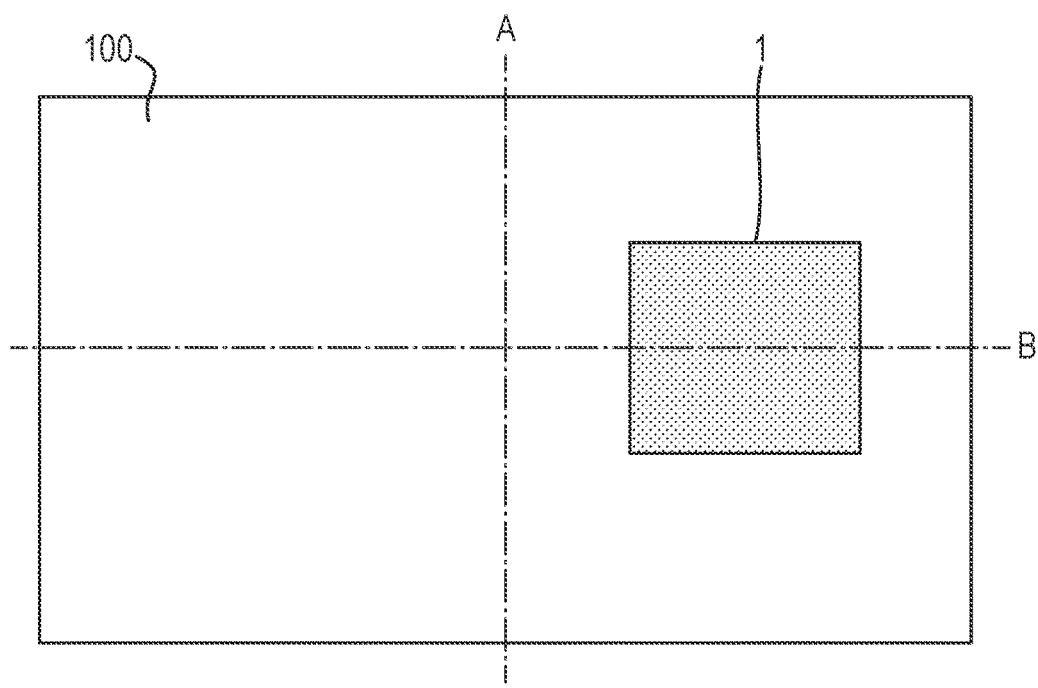
FIG. 18 shows, schematically, a security document including an eighth embodiment of a security element.
Figure 19A:
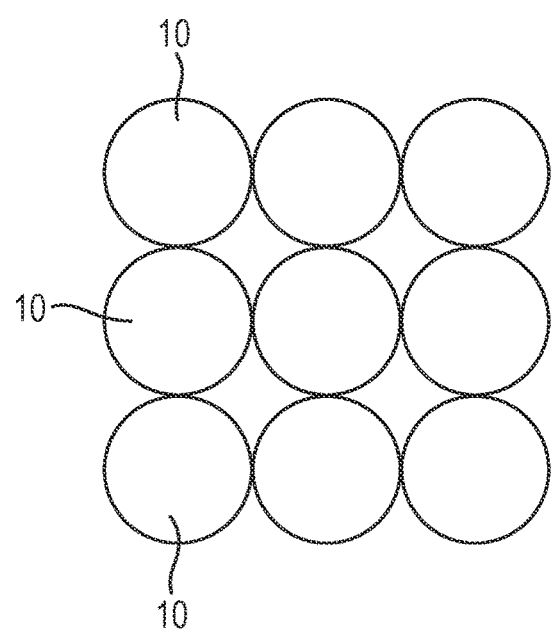
FIGS. 19A to 19C show, schematically, enlarged portions of the security element of the eighth embodiment.
Figure 19B:
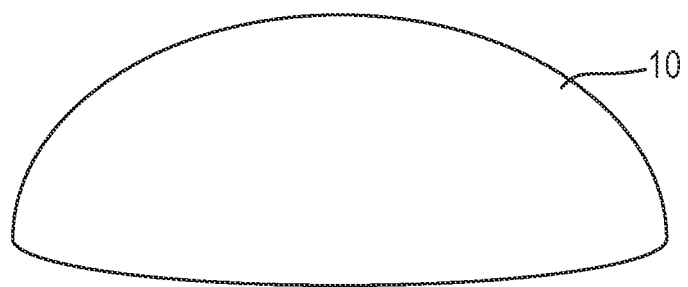
Figure 19C:
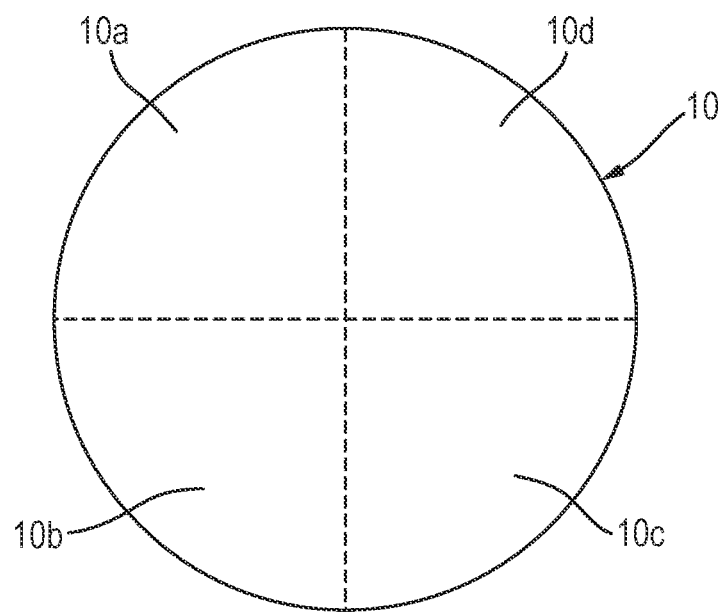

In another embodiment, shown in FIGS. 18 to 19C, convex-shaped image regions are used. FIG. 18 shows another security document 100, again a banknote, with a security element 1. The security element in this embodiment comprises a two-dimensional array of convex dome shaped image regions 10, i.e. semi-spherical image regions, which are substantially circular in plan view, as shown in FIG. 19A. While semi-spherical image regions are used here, aspherical image regions may also be used. Additionally, the thickness of the device may be decreased by using a diverging Fresnel mirror, as described above. A single image region 10 is shown in perspective view in FIG. 19B, omitting the plasmonic nanostructures. FIG. 19C shows a single image region 10 divided into a set of sub-regions. In this embodiment, the image region 10 is divided into quarters so as to define four sub-regions 10a, 10b, 10c, 10d. While not shown in this embodiment, these sub-regions are assigned corresponding arrays of plasmonic nanostructures. Specifically, the first sub-regions 10a are assigned a plasmonic nanostructure array defining a first image, the second sub-regions are assigned a plasmonic nanostructure array defining a different second image, and similarly the third and fourth sub-regions are assigned plasmonic nanostructure arrays defining the respective third and fourth different images. As before, each sub-region will carry a respective portion of the corresponding image, such that, for example, all first image sub-regions 10a, in combination, exhibit the first image across the security element. As this security element 1 is tilted about axes A and B, the four different images will be visible at different viewing angles. In particular, the image that is visible will correspond to the sub-region from which light is reflecting in the direction of the viewer. Light incident along a single direction will be directed in different directions by the different sub-regions in accordance with the local surface normal in those sub-regions. In particular, each sub-region is itself convex as so the local surface normal varies across each individual sub-region. This acts to ensure that each image is visible over a relatively wide range of viewing angles and prevents narrow viewing windows for each of the images. It will be appreciated that fewer than or more than four sub-regions may be used, as well as different arrangements of the sub-regions, depending on the effect desired.

Figure 24B:
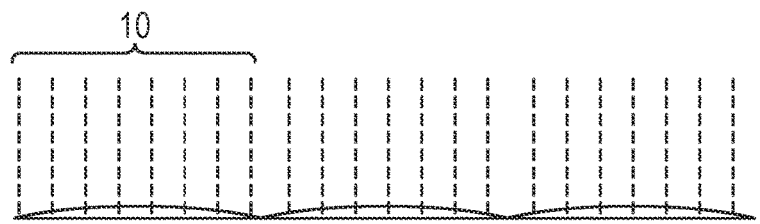
FIGS. 24A to 24C show, schematically, a plan view and first and second cross-sections through a security element according to the invention.
Figure 24A:
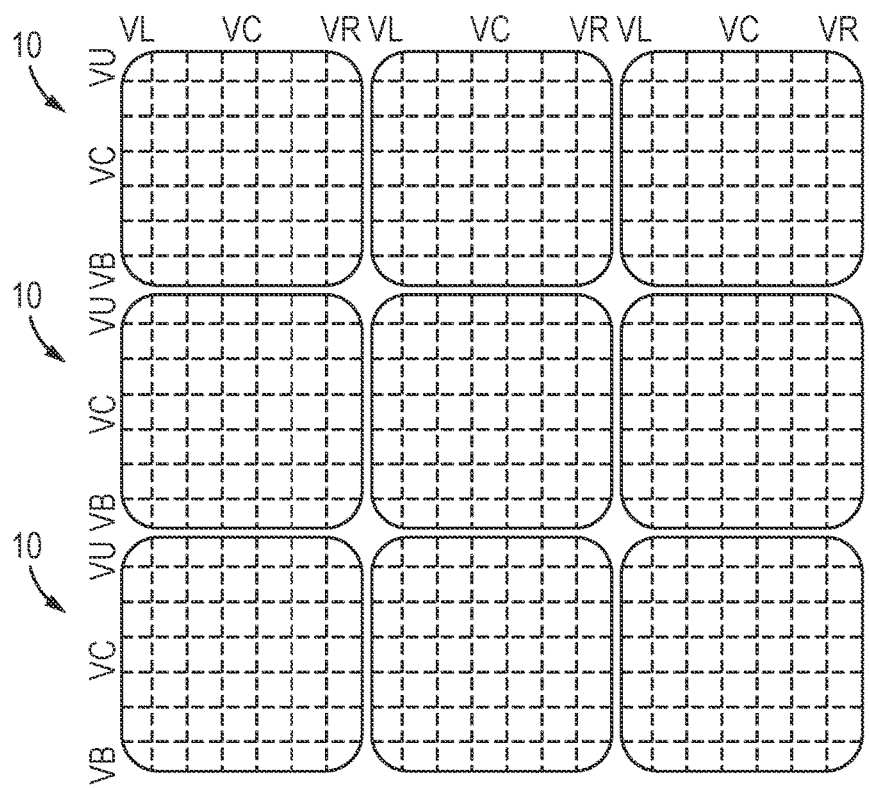
Figure 24C:
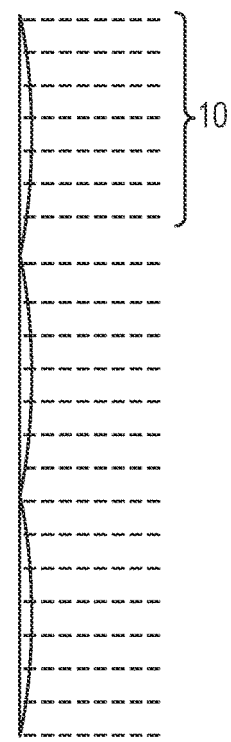

A more complex arrangement for a two-dimensional array of image regions is shown in FIGS. 24A to 24C. In particular, FIG. 24A shows a small area of the security element in plan view, illustrating a three by three arrangement of image regions, although again it will be appreciated that many more than this are typically provided across the full security element. Here, the image regions 10 again repeat along two orthogonal directions of the security element. FIG. 24B shows a cross-section through the image regions 10 along a first of the two orthogonal repeat directions. As illustrated in FIG. 24B, each image region 10 is convex along this first repeat direction such that the sub-regions vary in average inclination along this direction. FIG. 24C shows a cross-section through the image regions 10 along a second of the two orthogonal repeat directions and again illustrates that each image region 10 is convex along this second repeat direction. As shown in FIG. 24A, each image region is divided into a seven by seven array of sub-regions for a total of 49 sub-regions. Here, the sub-regions are interlaced along the same two orthogonal directions along which the image regions repeat and each sub-region will thereby have a unique average inclination with respect to the plane of the security element as a result of the image region being convex along both orthogonal directions. That is, the sub-regions are interlaced from left to right (from VL to VR in the Figure) along the image region as well as from top to bottom (from VU to VB in the Figure). As with the previous embodiment, each of these sub-regions is associated with a respective image. Respective arrays of plasmonic nanostructures are provided across the image regions such that, within each image region, each sub-region carries a corresponding portion of a respective image. The resulting security element will exhibit 49 different images as it is tilted along two orthogonal directions in accordance with the local surface normal across the sub-regions. For example, the top-left sub-region within each image region will carry a corresponding portion of a first image, such that when the security element is arranged such that incident light is reflected from each of these top-left sub-regions towards the viewer, the first image will be visible as a result of the combined appearance of these top-left sub-regions. The same will be true of each of the other sets of sub-regions at their own corresponding viewing angles. In other words, each image region will effectively display a respective pixel of one of the 49 images in accordance with the viewing angle such that each of the 49 images is visible across the security device over the respective viewing angle ranges.

Figure 20:
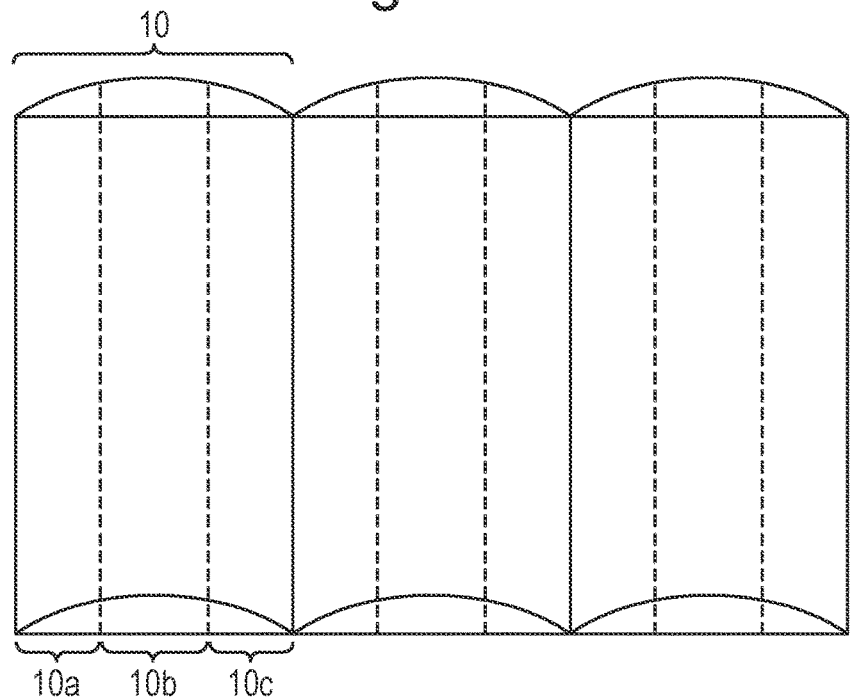
FIG. 20 shows, schematically, an enlarged portion of a security element according to a ninth embodiment.

The use of convex reflective image regions can also be employed with a one-dimensional array of image regions, and an embodiment of such a security element is shown in FIG. 20. This shows a small area of the security element, illustrating the arrangement of the surface of the security element across three image regions 10 in a perspective view. As can be seen in this figure, each image region 10 is elongate with a constant circular segment cross-section, defining a partial cylinder shaped, or semi-cylindrical, image region 10. Each image region is divided lengthwise into three sub-regions 10a, 10b, 10c, which will be provided with respective arrays of plasmonic nanostructures, each defining a different respective image across the corresponding sets of sub-regions. That is, each first sub-region, for example, carries a different "slice" of the first image, such that the combined appearance of the first sub-region displays this first image to the viewer. As this security element is rotated about an axis parallel with the length of the image regions 10, the three different images will be visible over different viewing angle ranges depending on the local surface normal in each of the different sub-regions 10a, 10b, 10c. That is, light incident along a single direction will be directed in different directions by the three different sub-regions in accordance with the local surface normal in those sub-regions. Since each sub-region is itself convex along the direction perpendicular to the length of the image regions, the local surface normal varies across each individual sub-region in a plane perpendicular to the length of the image regions. This acts to ensure that each image is visible over a relatively wide range of viewing angles as the security element is rotated about the axis parallel with the length of the image regions 10 and, again, prevents narrow viewing windows for each of the images.

Figure 21A:
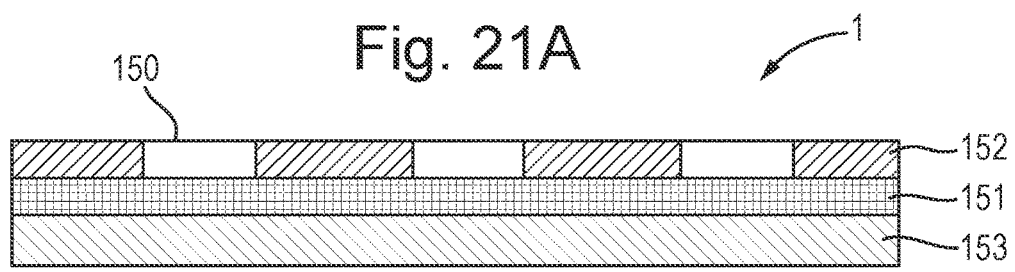
FIGS. 21A to 21B show, schematically an enlarged cross-sectional view and plan view of an array of plasmonic nanostructures suitable for use in security elements according to the invention.

The above embodiments have described plasmonic nanostructures in the form of nanopillars, as shown in FIGS. 3 and 10; however, as mentioned above, other types of plasmonic nanostructures can be used. FIGS. 21A to 22 show other plasmonic nanostructures.

Figure 21B:
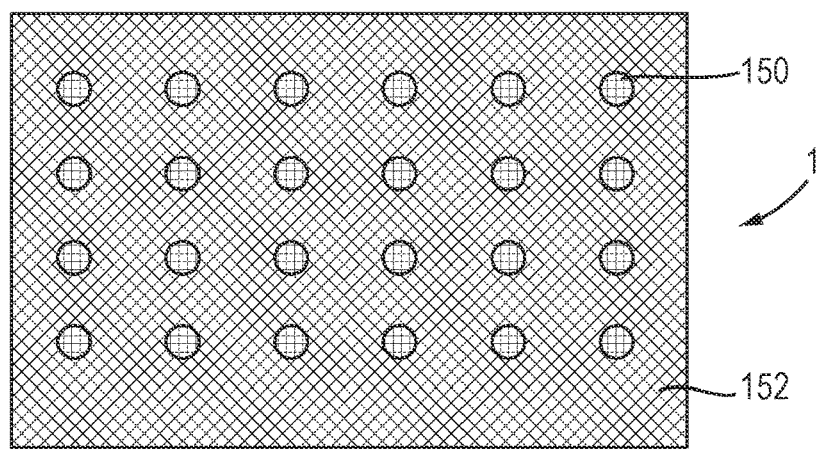
Figure 22:
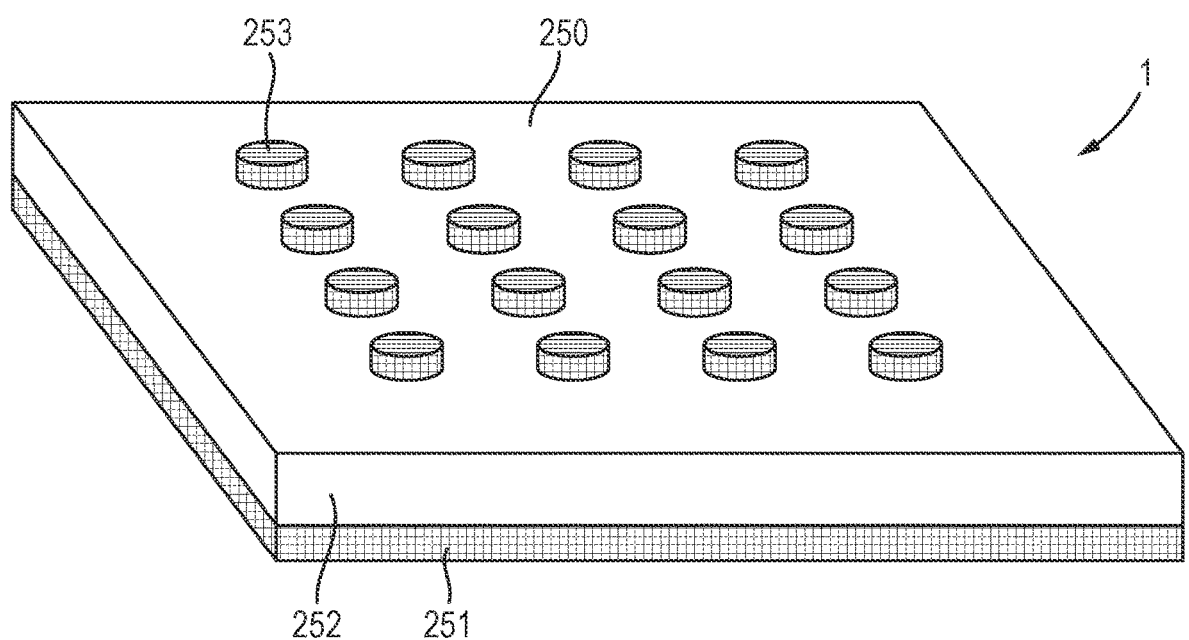
FIG. 22 shows, schematically, an enlarged perspective view of an array of plasmonic nanostructures suitable for use in security elements according to the invention.

FIGS. 21A and 21B show plasmonic nanostructures in the form of an array of nanoholes 150. The surface of the security element 1 includes a base layer in the form of a continuous metal layer 153, such as aluminium. Over this metal layer is provided a continuous layer of dielectric material. The layer of dielectric material is then coated on its upper surface in a layer of metal 152. The metal layer 152 includes an array of circular holes formed through the metal layer, exposing the continuous dielectric layer. This structure produces plasmonic colour effects in much the same way described above with respect to nanopillar structures. Again, the shape of the holes, the size of the holes and their spacing can be varied in order to control the colour generated by these plasmonic nanostructures.

FIG. 22 shows plasmonic nanostructures in the form of an array of nanodiscs 250 on a continuous layer of dielectric material. The surface of the security element 1 includes a continuous metal layer 251, for example aluminium or more rarely gold, on top of which is provided a continuous dielectric layer 252, for example silicon dioxide (SiO$_2$). On the dielectric layer sits an array of circular metal nanoplates 253, again aluminium or more rarely gold is used as an example of a suitable material, that complete the nanostructure. Again, the shape of the plates, the size of the plates and their spacing can be varied in order to control the colour generated by these plasmonic nanostructures.

Figure 23A:
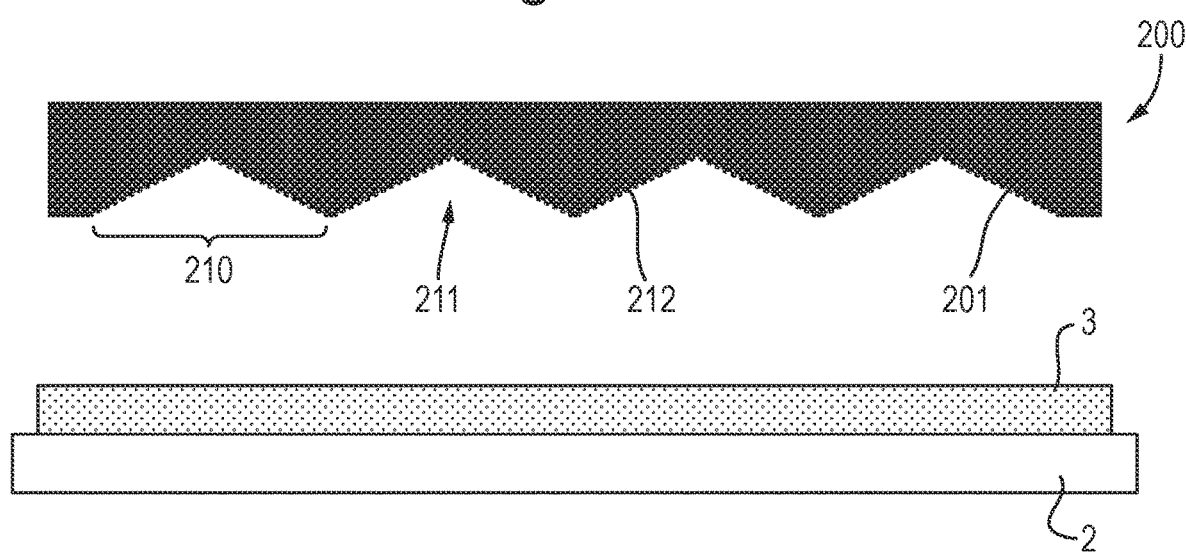
FIGS. 23A to 23D show, schematically, four different stages during a method of manufacture of the security element of the first embodiment.

While electron beam origination has been mentioned, preferably the above structures are formed in web-based on sheet fed production methods, which more typically require UV cast-cure or thermoplastic embossing techniques. A specific example will now be described in which the structures are formed using a cast-cure process and the process is illustrated in FIGS. 23A to 23D. The surface structure, including both the coarse image region surface structure providing the inclinations of the sub-regions and the plasmonic nanostructures can be provided in a master die, for example by using e-beam lithography. FIG. 23A shows a master die 200 with a negative of the desired surface structure 201. This surface structure in the die defines negatives of array of image regions 210, including an array of nanopillars 212 and the prismatic structure 211. FIG. 23A also shows a transparent support layer 2, which may be a layer of the final security element 1. On the surface of the transparent support layer 2 is provided a UV curable material 3. In alternative embodiments, the curable material 3 is directly applied onto the security document and the surface relief subsequently formed in the surface of the curable material while on the security document. This alternative requires no subsequent transferral of the security element onto a security document. In embodiments that require a metal base layer, this may be applied first to a carrier layer or security document and a curable dielectric layer applied thereover. A transparent die 200 may be used to cure the material on the metal layer. In yet further alternatives, the security element may be formed directly into the substrate of the security document by using a formable polymer substrate in place of the UV curable material 3.

Figure 23B:
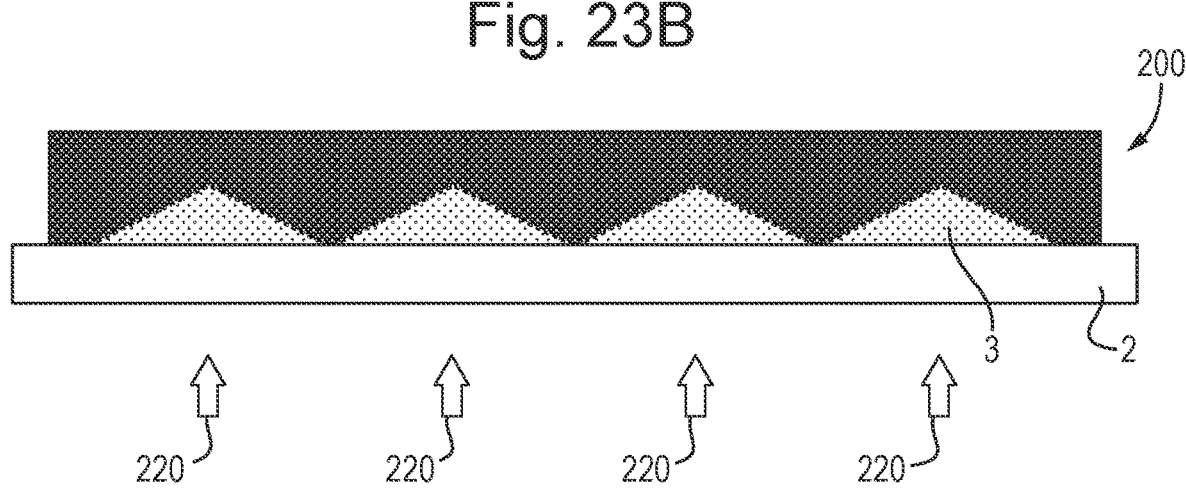

FIG. 23B shows the die 200 being brought into contact with the curable material 3 so as to form the curable material into the desired surface shape, i.e. into a series of prismatic elements with nanopillars provided on the facets. FIG. 22B also illustrates that the curable material 3 is exposed to UV radiation 220 through the transparent support layer 2, while in contact with the die 200.

Figure 23C:
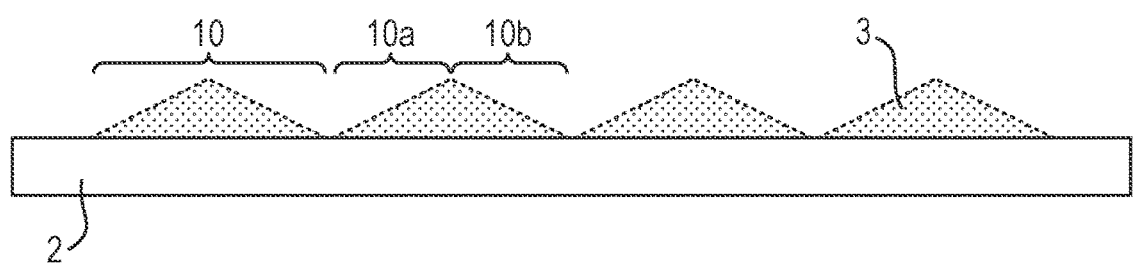

FIG. 23C shows the cured curable material 3, which corresponds to the first layer of the security element discussed above, after separation from the die 200. The cured curable material now exhibits a plurality of image regions 10 with corresponding sub-regions 10a, 10b and respective arrays of nanopillars.

Figure 23D:
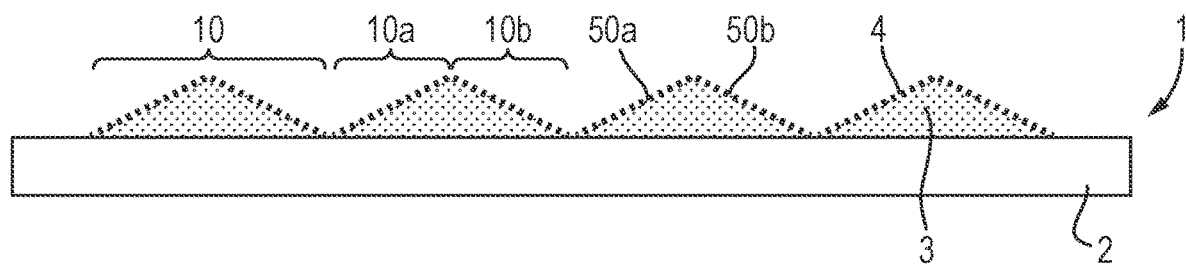

FIG. 23D shows a cross section of the final security element 1 after the surface has been coated in a metal enhancing layer 4, to form the nanodiscs on the top of the nanopillars. The metal layer may be formed using an electron beam evaporator, which directionally deposits metal so that a metal nanodisc is formed on the tops on nanopillars. As can be seen here, the security element comprises the layer of cured curable material 3 whose surface carries array of image regions 10, each having first and second sub-regions 10a, 10b, and each sub-region including first and second arrays of plasmonic nanostructures 50a, 50b.

Security elements of the sorts described above are suitable for forming on security articles such as threads, stripes, patches, foils and the like which can then be incorporated into or applied onto security documents such as banknotes. The security elements can also be constructed directly on security documents, such as polymer banknotes.

Security elements of the sorts described above can be incorporated into or applied to any product for which an authenticity check is desirable. In particular, such devices may be applied to or incorporated into documents of value such as banknotes, passports, driving licences, cheques, identification cards etc. The security element can either be formed directly on the security document (e.g. on a polymer substrate forming the basis of the security document) or may be supplied as part of a security article, such as a security thread or patch, which can then be applied to or incorporated into such a document. The security element may be applied to a security document, for example by using a pressure sensitive adhesive.

Such security articles can be arranged either wholly on the surface of the base substrate of the security document, as in the case of a stripe or patch, or can be visible only partly on the surface of the document substrate, e.g. in the form of a windowed security thread. Security threads are now present in many of the world's currencies as well as vouchers, passports, travelers' cheques and other documents. In many cases the thread is provided in a partially embedded or windowed fashion where the thread appears to weave in and out of the paper and is visible in windows in one or both surfaces of the base substrate. One method for producing paper with so-called windowed threads can be found in EP 0059056 A1. EP 0860298 A2 and WO 03095188 A2 describe different approaches for the embedding of wider partially exposed threads into a paper substrate. Wide threads, typically having a width of 2 to 6 mm, are particularly useful as the additional exposed thread surface area allows for better use of optically variable devices, such as that presently disclosed.

Base substrates suitable for making security substrates for security documents may be formed from any conventional materials, including paper and polymer. Techniques are known in the art for forming substantially transparent regions in each of these types of substrate. For example, WO 8300659 A1 describes a polymer banknote formed from a transparent substrate comprising an opacifying coating on both sides of the substrate. The opacifying coating is omitted in localised regions on both sides of the substrate to form a transparent region. In this case the transparent substrate can be an integral part of the security element or a separate security element can be applied to the transparent substrate of the document. WO 0039391 A1 describes a method of making a transparent region in a paper substrate. Use of full or half-window features in this way allows the security element to be applied to one side of the security document for viewing from the opposite side, through the window.

The security element may also be applied to one side of a paper substrate, optionally so that portions are located in an aperture formed in the paper substrate. An example of a method of producing such an aperture can be found in WO 03054297 A2. An alternative method of incorporating a security element which is visible in apertures in one side of a paper substrate and wholly exposed on the other side of the paper substrate can be found in WO 2000/39391 A1.

The security element of the current invention can be made machine readable by the introduction of detectable materials in any of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials.

Particularly in embodiments in which the plasmonic nanostructures include a continuous metal layer, the security element can be used to conceal the presence of a machine readable dark magnetic layer. When a magnetic material is incorporated into the device the magnetic material can be applied in any design but common examples include the use of magnetic tramlines or the use of magnetic blocks to form a coded structure. Suitable magnetic materials include iron oxide pigments ($Fe_2O_3$ or $Fe_3O_4$), barium or strontium ferrites, iron, nickel, cobalt and alloys of these. In this context the term "alloy" includes materials such as Nickel:Cobalt, Iron:Aluminium:Nickel:Cobalt and the like. Flake Nickel materials can be used, in addition Iron flake materials are suitable. Typical nickel flakes have lateral dimensions in the range 5-50 microns and a thickness less than 2 microns. Typical iron flakes have lateral dimensions in the range 10-30 microns and a thickness less than 2 microns.

Figure 25:
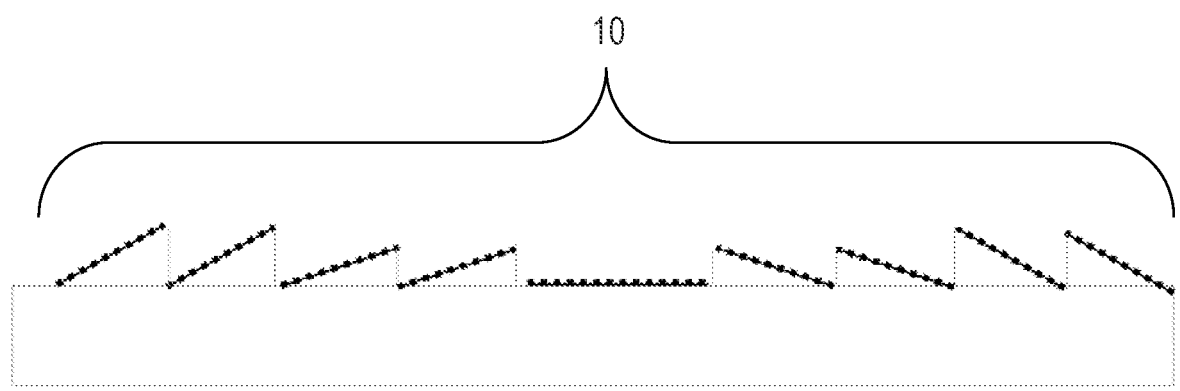
FIG. 25 shows a surface shaped to define a diverging Fresnel mirror.

FIG. 25 shows a surface shaped to define a diverging Fresnel mirror. A diverging Fresnel mirror is essentially an arrangement of facets that substantially replicate the surface of a convex mirror, but eliminate the unnecessary thickness towards the centre of the mirror arrangement by providing each facet at substantially the same height. This structure operates on the same principle as Fresnel lenses, which are well known in the art. These structures have the advantage of reduced thickness compared with the convex structure they emulate. The facets of the diverging Fresnel mirror shown are substantially planar to approximate respective areas of the replicated convex structure, but could also be convex to more accurately replicate a convex structure.

The invention claimed is:

1. A security element comprising:
   a first layer having a first surface;
   an array of elongate image regions across the first surface, each of the elongate image regions extending in a first direction and the array of elongate image regions being arranged along a second direction along the first surface substantially perpendicular to the first direction, and each elongate image region being divided lengthwise into at least a first sub-region and a second sub-region such that the sub-regions are interlaced along the second direction;
   a first array of plasmonic nanostructures provided in or on the first surface across the first sub-regions, the first array of plasmonic nanostructures defining in each first sub-region a corresponding portion of a first image, wherein the plasmonic nanostructures have dimensions of 500 nm or less; and
   a second array of plasmonic nanostructures provided in or on the first surface across the second sub-regions, the second array of plasmonic nanostructures defining in each second sub-region a corresponding portion of a second image, wherein the plasmonic nanostructures have dimensions of 500 nm or less;
   wherein the first surface is arranged such that each sub-region has a respective average inclination, the average inclinations of the first sub-regions are such that the first image is displayed at least at a first viewing angle, and the average inclinations of the second sub-regions are such that the second image is displayed at least at a second viewing angle different from the first viewing angle and such that the second image is substantially not displayed or only partially displayed at least at the first viewing angle; and
   wherein the sub-regions of each image region are defined by an arrangement of at least four facets that substantially replicate inclinations of a convex surface and in which each facet is provided at substantially the same height, each set of sub-regions corresponding to one of the four facets of each image region comprises a respective array of plasmonic nanostructures defining corresponding portions of a respective image displayed at a respective viewing angle, and each respective image is different.

2. A security element according to claim 1, wherein the arrangement of facets that substantially replicate inclinations of a convex surface define a diverging Fresnel mirror.

3. A security element according to claim 1, wherein the plasmonic nanostructures of the first and/or second of plasmonic nanostructures vary in at least their spacing between the corresponding first and/or second sub-regions to provide image information of the corresponding first and/or second image.

4. A security element according to claim 1, wherein the facets are convex or substantially planar.

5. A security element comprising:
   a first layer having a first surface;
   an array of image regions across the first surface, each image region comprising at least a first sub-region and a second sub-region;
   a first array of plasmonic nanostructures provided in or on the first surface across the first sub-regions, the first array of plasmonic nanostructures defining in each first sub-region a corresponding portion of a first image, wherein the plasmonic nanostructures have dimensions of 500 nm or less, and the plasmonic nanostructures of the first array of plasmonic nanostructures vary in at least one of their shape, size and spacing across the first sub-regions to provide image information of the first image; and
   a second array of plasmonic nanostructures provided in or on the first surface across the second sub-regions, the second array of plasmonic nanostructures defining in each second sub-region a corresponding portion of a second image, wherein the plasmonic nanostructures have dimensions of 500 nm or less, and the plasmonic nanostructures of the second array of plasmonic nanostructures vary in at least one of their shape, size and spacing across the second sub-regions to provide image information of the second image; wherein
   the first surface is arranged such that each sub-region has a respective average inclination, the average inclinations of the first sub-regions are such that the first image is displayed at least at a first viewing angle and the average inclinations of the second sub-regions are such that the second image is displayed at least at a second viewing angle different from the first viewing angle and such that the second image is substantially not displayed or only partially displayed at least at the first viewing angle; and
   each image region further comprises a third sub-region, the first surface is arranged such that each third sub-region has a respective average inclination, and the first surface is arranged such that third sub-regions are visible at least at a third viewing angle, the third viewing angle being between the first and second viewing angles, and further comprising a uniform structure provided across the third sub-regions defining a neutral image, wherein the uniform structure comprises an array of anti-reflective microstructures, an achromatic microstructure, or one or more diffraction gratings.

6. A security element according to claim 5, wherein each third sub-region is substantially parallel with a plane of the security element.

7. A security element according to claim 5, wherein the first surface is arranged such that each third sub-region comprises a substantially planar facet.

8. A security element according to claim 5, wherein the plasmonic nanostructures of the first and/or second of plasmonic nanostructures vary in at least their spacing between the corresponding first and/or second sub-regions to provide image information of the corresponding first and/or second image.

* * * * *